(12) United States Patent
Zielinska et al.

(10) Patent No.: US 12,358,835 B2
(45) Date of Patent: Jul. 15, 2025

(54) METAL-GLASS MACROCOMPOSITES AND COMPOSITIONS AND METHODS OF MAKING

(71) Applicant: UPTERIOR, LLC, New York, NY (US)

(72) Inventors: Agnieszka Zielinska, New York, NY (US); Anna Zielinska, New York, NY (US); Marian Klisch, Krosno (PL)

(73) Assignee: UPTERIOR, LLC, New York, NY (US)

(*) Notice: Subject to any disclaimer, the term of this patent is extended or adjusted under 35 U.S.C. 154(b) by 0 days.

(21) Appl. No.: 18/225,384

(22) Filed: Jul. 24, 2023

(65) Prior Publication Data

US 2024/0025804 A1    Jan. 25, 2024
US 2024/0294422 A9    Sep. 5, 2024

Related U.S. Application Data

(63) Continuation of application No. 17/670,856, filed on Feb. 14, 2022, now Pat. No. 11,746,044, which is a continuation of application No. 16/094,753, filed as application No. PCT/US2017/028688 on Apr. 20, 2017, now Pat. No. 11,247,936.

(60) Provisional application No. 62/325,137, filed on Apr. 20, 2016.

(51) Int. Cl.
    C03C 14/00    (2006.01)
    C03C 3/21     (2006.01)
    C03B 25/02    (2006.01)

(52) U.S. Cl.
    CPC ............ *C03C 14/004* (2013.01); *C03C 3/21* (2013.01); *C03C 14/00* (2013.01); *C03B 25/02* (2013.01); *C03C 2214/04* (2013.01); *C03C 2214/08* (2013.01); *C03C 2214/30* (2013.01); *C03C 2214/34* (2013.01)

(58) Field of Classification Search
    CPC ..... C03C 14/004; C03C 3/21; C03C 2214/04; C03C 2214/08; C03C 2214/30; C03C 2214/34; C03B 25/02
    See application file for complete search history.

(56) References Cited

U.S. PATENT DOCUMENTS

| | | | |
|---|---|---|---|
| 1,425,606 | A | 8/1922 | Quackenbush et al. |
| 1,456,110 | A | 5/1923 | Mackay |
| 2,062,335 | A | 12/1936 | Howard |
| 2,371,627 | A | 3/1945 | Kingston |

(Continued)

FOREIGN PATENT DOCUMENTS

| | | |
|---|---|---|
| CN | 101058477 B | 10/2007 |
| CN | 105008296 A | 7/2015 |

(Continued)

OTHER PUBLICATIONS

JP3555051B2 machine translation (Year: 2004).*

(Continued)

*Primary Examiner* — Bryan D. Ripa
*Assistant Examiner* — Cameron K Miller
(74) *Attorney, Agent, or Firm* — Mueting Raasch Group

(57) ABSTRACT

A glass composition, a macrocomposite, and methods of forming the macrocomposite including dispersing or immersing a metal in a glass. Preferably, the macrocomposite does not include an organic resin, an adhesive, or a polymer.

13 Claims, 8 Drawing Sheets

(56) References Cited

U.S. PATENT DOCUMENTS

| | | | |
|---|---|---|---|
| 2,422,628 A | 6/1947 | McCarthy | |
| 2,523,155 A | 9/1950 | Shoupp | |
| 2,743,553 A | 5/1956 | Armistead | |
| 2,962,389 A | 11/1960 | Menke | |
| 3,206,355 A | 9/1965 | Pfaender | |
| 3,407,091 A * | 10/1968 | Busdiecker | C03C 29/00 |
| | | | 65/117 |
| 3,443,914 A | 5/1969 | Hayashi | |
| 3,722,074 A | 3/1973 | Klomp | |
| 3,801,367 A | 4/1974 | Blair et al. | |
| 4,109,054 A | 8/1978 | Burgyan | |
| 4,940,677 A | 7/1990 | Beall et al. | |
| 5,024,883 A | 6/1991 | Singhdeo et al. | |
| 5,043,222 A | 8/1991 | Cherukuri | |
| 5,328,874 A | 7/1994 | Beall et al. | |
| 6,667,258 B2 | 12/2003 | Quinn | |
| 10,947,151 B2 | 3/2021 | Zielinska et al. | |
| 11,247,936 B2 | 2/2022 | Zielinska et al. | |
| 2006/0019044 A1 | 1/2006 | Watanabe | |
| 2006/0207289 A1 | 9/2006 | Hale | |
| 2012/0324952 A1 | 12/2012 | Fiorentini et al. | |
| 2013/0330604 A1 | 12/2013 | Kroll et al. | |
| 2014/0004168 A1 | 1/2014 | Petit et al. | |
| 2014/0154292 A1 | 6/2014 | Borrelli et al. | |
| 2014/0228197 A1 | 8/2014 | Oogaki | |
| 2015/0194552 A1* | 7/2015 | Ogasahara | H01L 31/18 |
| | | | 136/256 |
| 2019/0127268 A1 | 5/2019 | Zielinska et al. | |
| 2021/0009465 A1 | 1/2021 | Zielinska et al. | |
| 2022/0162116 A1 | 5/2022 | Zielinska et al. | |

FOREIGN PATENT DOCUMENTS

| | | | |
|---|---|---|---|
| EP | 0866041 A2 | 9/1998 | |
| EP | 1 757 567 A1 | 2/2007 | |
| EP | 2664589 A1 | 11/2013 | |
| EP | 3445729 A1 | 2/2019 | |
| EP | 3445730 A1 | 2/2019 | |
| GB | 894 328 A | 4/1962 | |
| GB | 2 397 581 A | 7/2004 | |
| JP | H03-138329 A | 6/1991 | |
| JP | 2002-241904 A | 8/2002 | |
| JP | 3555051 B2 * | 8/2004 | |
| WO | WO 2006/128208 A1 | 12/2006 | |
| WO | WO 2005/121045 A1 | 4/2008 | |
| WO | WO 2014/166082 A1 | 10/2014 | |
| WO | WO 2017/184891 A1 | 10/2017 | |
| WO | WO 2017/184897 A1 | 10/2017 | |

OTHER PUBLICATIONS

U.S. Appl. No. 16/094,750, filed Oct. 18, 2018, Upterior, LLC.

"84 Series" Design by Omar Arbel, 2017. Bocci Design and Manufacturing Inc. Retrieved on Dec. 13, 2018. Retrieved from the Internet: < https://www.bocci.ca/app/uploads/2018/02/84-Product-Sheet_2018.pdfe>; 7 pages.

ASTM C336-71 (2015), Standard Test Method for Annealing Point and Strain Point of Glass by Fiber Elongation.

Boccaccini et al., "Borosilicate glass matrix composites reinforced with short metal fibres," 1994, *Glass Science and Technology*, 67(1):16-20.

Borgna, "Artist Q&A: Albert Paley mixes metal, glass," The Leader, Mar. 27, 2016, available online http://www.the-leader.com/news/20160327/artist-qa-albert-paley-mixes-metal-glass [retrieved from the internet Oct. 23, 2018]; 3 pages.

Brow, "PbO-free glasses for low temperature packaging" Sandia Report SAND-97-2391, Published Oct. 1, 1997, Sandia National Laboratories, Albuquerque, New Mexico, 44 pages.

Daniel, "State-of-the-Art Report on Fiber Reinforced Concrete", ACI 544.IR-96 2001, (Reapproved 2002), *Manual of Concrete Practice*, ACI Committee 544, American Concrete Institute, 66 pages.

DesignView, Design No. 003611144-0001, Sep. 1, 2017. Bocci Design & Manufacturing Inc. [online]. Vancouver, CA. Retrieved on Dec. 13, 2018. Retrieved from the Internet: < https://www.bocci.ca/ >; 5 pages.

DesignView, Design No. 003611144-0002, Sep. 1, 2017. Bocci Design & Manufacturing Inc. [online]. Vancouver, CA. Retrieved on Dec. 13, 2018. Retrieved from the Internet: < https://www.bocci.ca/ >; 5 pages.

DesignView, Design No. 003611144-0003, Sep. 1, 2017. Bocci Design & Manufacturing Inc. [online]. Vancouver, CA. Retrieved on Dec. 13, 2018. Retrieved from the Internet: < https://www.bocci.ca/ >; 4 pages.

DesignView, Design No. 003611144-0004, Sep. 1, 2017. Bocci Design & Manufacturing Inc. [online]. Vancouver, CA. Retrieved on Dec. 13, 2018. Retrieved from the Internet: < https://www.bocci.ca/ >; 4 pages.

FontanaArte, "Pinecone" Design by Paola Navone, 2016. Retrieved on Dec. 13, 2018. Retrieved from the Internet: <http://www.fontanaarte.com/en/lighting/suspension-lamp/pinecone>; 5 pages.

Gonella, "Metal nanocluster composite silicate glasses," 2007, *Rev. Adv. Mater. Sci.*, 14:134-143.

Hynd, "Flat Glass Manufacturing Process" (Chapter 2) in *Glass: Science and Technology* vol. 2: Processing I. Uhlmann & Kreidl (Eds.) Academic Press, Inc., New York, NY; 1984, Title page, publisher's page, table of contents, pp. 45-106.

Karabulut et al., "Mechanical and structural properties of phosphate glasses," 2001, *Journal of Non-Crystalline Solids*, 288:8-17.

Kim et al., "Iron Phosphate Glass as an Alternative Waste-Form for Hanford LAW," Feb. 2003, Pacific Northwest National Laboratory PNNL 14251. 59 pages.

Koudelka et al., "Structure and properties of titanium-zinc borophosphate glasses," 2005, *Journal of Solid State Chemistry*, 178:1837-43.

Lim et al., "Properties and structures of tin borophosphate glasses," 2010, *Journal of Non-Crystalline Solids*, 356:1379-84.

Loehman et al., "Development of High Performance Seals for Solid Oxide Fuel Cells," SECA Core Technology Program Review. Albuqerque, NM Sep. 30-Oct. 1, 2003, 13 pages. [retrieved from the internet Oct. 23, 2018].

Loehman et al., "Engineered Glass Composites for Sealing Solid Oxide Fuel Cells," SECA Core Technology Program Review. Boston, MA, May 11-13, 2004, 23 pages. [retrieved from the internet Oct. 23, 2018].

Loehman et al., "Engineered Glass Composites for Sealing Solid Oxide Fuel Cells," SECA Core Technology Program Review. Lakewood, CO, Oct. 25-26, 2005, 28 pages. [retrieved from the internet Oct. 23, 2018].

Rajbhandari et al., "Doping of low-Tg phosphate glass with Al2O3, B2O3 and SiO2: Part I—effect on glass property and stability", Materials Chemistry and Physics 183 (2016): 542-550 (Year: 2016).

Sathishkumar et al., "Glass fiber-reinforced polymer composites—a review" 2014, Journal of Reinforced Plastics and Composites 33(13):1258-1275.

Scholes, "The Principles of Glassworking" (Chapter 14) in *Modern Glass Practice*, 7th completely revised and enlarged edition by C.H. Greene, Cahners Books, Boston MA; 1975. Cover page, publisher's page, table of contents, pp. 225-237, 492-493.

Seward III et al., "Inorganic Glasses: Commercial Glass Families, Applications, and Manufacturing Methods" (Chapter 6) in *Handbook of Ceramics, Glasses, and Diamonds*. Harper (Ed.) McGraw-Hill Professional: New York, NY; 2001. (Entire text of book provided.).

Shi, "Properties of Alkaline-Resistant Calcium-Iron-Phosphate Glasses," Fall 2007 Masters Theses: Student Research & Creative Works, Missouri University of Science and Technology, *Scholars' Mine*, 1-67.

Smith, "The Structure and Properties of Ternary Zinc Phosphate Glasses for Optical Applications," Spring 2014, Doctoral Dissertations: Student Research & Creative Works, Missouri University of Science and Technology, *Scholars' Mine*, pp. 1-197.

Tiwari et al., "Preparation and Characterization of Phosphate Glasses Containing Titanium," 2007, *BARC Newsletter (Founder's Day Special Issue)*, (285):167-73.

(56) References Cited

OTHER PUBLICATIONS

*Trame: Le forme del rame tra arte contemporanea, design, tecnologia e architettura* (English Translation: "Copper Crossings: Copper Shapes in Contemporary Art, Design, Technology and Architecture"), 2014, Skira, ISBN: 885722506, Cover page, title page, and table of contents. 15 pages.

Varshneya et al., Fundamentals of Inorganic Glasses: Third Edition, 2019, Elsevier, Amsterdam, Netherlands, Cover, Title Page, Publishing Information, Table of Contents, and pp. 1-5.

Walker, *Contemporary Fused Glass: A Guide to Fusing, Slumping, and Kilnforming*, Four Corners International, Clemmons, NC, 2010. Cover page, title page, publisher's page, table of contents, p. 208.

Wen et al., "Chemical resistance of Non-Lead Phosphate Sealing Glass," 2006, *Amer. Cer. Soc. Bulletin*, 85(7):9201-9207.

International Patent Application No. PCT/US2017/028688, filed Apr. 20, 2017; International Search Report and Written Opinion issued Jul. 28, 2017; 14 pages.

International Patent Application No. PCT/US2017/028688, filed Apr. 20, 2017; International Preliminary Report on Patentability issued Nov. 1, 2018; 8 pages.

International Patent Application No. PCT/US2017/028681, filed Apr. 20, 2017; International Search Report and Written Opinion issued Oct. 12, 2017; 15 pages.

International Patent Application No. PCT/US2017/028681, filed Apr. 20, 2017; International Preliminary Report on Patentability issued Nov. 1, 2018; 9 pages.

European Patent Application No. 20174738.3, filed May 14, 2020; Extended European Search Report issued Aug. 11, 2020, 7 pages.

\* cited by examiner

METAL-GLASS MACROCOMPOSITES AND COMPOSITIONS AND METHODS OF MAKING

CONTINUING APPLICATION DATA

This application is a continuation application of U.S. patent application Ser. No. 17/670,856, filed Feb. 14, 2022, which is a continuation application of U.S. patent application Ser. No. 16/094,753, filed Oct. 18, 2018 and issued as U.S. Pat. No. 11,247,936 on Feb. 15, 2022, which is the § 371 U.S. National Stage of International Application No. PCT/US2017/028688, filed Apr. 20, 2017, which claims the benefit of U.S. Provisional Application No. 62/325,137, filed Apr. 20, 2016, the disclosures of each of which are incorporated by reference herein in their entireties.

BACKGROUND

The combination of glass and metal is considered attractive by many artists, designers, and architects. Because of the mismatch of thermal and mechanical properties between common, commercially available silicate glass and most metals, however, an organic resin or polymer is often used to bind the materials in glass-metal laminates or other visual structures of artistic character. Such a resin or polymer limits both the thickness of the sandwiched structures and location of the metal within the structure. In the case of macrocomposites, the organic resin or polymer may alter their optical appearance, and in particular, the color and light reflection or refraction of the macrocomposite. Moreover, polymers, as substances of far lower hardness, chemical, and thermal durability than glass, may make glass-metal macrocomposites more prone to scratches and undesired reactions with liquids or heat, spoiling transparency or surface integrity of two-phase structures in which the polymer is on the surface.

SUMMARY

This disclosure describes macrocomposites and methods of forming a macrocomposite including a metal dispersed or immersed in a glass. Preferably, the macrocomposite does not include an organic resin, an adhesive, or a polymer.

In some embodiments, metal is dispersed or immersed, fully or partially, in glass. In some embodiments, metal is uniformly dispersed in glass; in some embodiments, metal is non-uniformly dispersed in glass.

In one aspect this disclosure describes a method of forming a macrocomposite that includes dispersing or immersing a metal in a glass. The metal has a volume of greater than 0.1 cubic millimeter ($mm^3$), greater than 1 $mm^3$, greater than 10 $mm^3$, greater than 100 $mm^3$, greater than 1000 $mm^3$, or greater than 10000 $mm^3$. The macrocomposite does not include an organic resin, an adhesive, or a polymer.

In another aspect, this disclosure describes a composition that includes a metal and glass. The glass includes ZnO and $P_2O_5$. The metal is dispersed or immersed in the glass, and the metal has a volume of greater than 0.1 $mm^3$, greater than 1 $mm^3$, greater than 10 $mm^3$, greater than 100 $mm^3$, greater than 1000 $mm^3$, or greater than 10000 $mm^3$.

In a further aspect, this disclosure describes a macrocomposite prepared by a method that includes dispersing or immersing a metal in a glass and annealing the glass after the metal is dispersed or immersed in the glass. The metal has a volume of greater than 0.1 $mm^3$, greater than 1 $m^3$, greater than 10 $mm^3$, greater than 100 $mm^3$, greater than 1000 $mm^3$, or greater than 10000 $mm^3$. The macrocomposite does not include an organic resin, an adhesive, or a polymer.

As used herein, "coefficient of thermal expansion" (also referred to herein as "thermal expansion coefficient") refers to a linear expansion coefficient. In some embodiments, the coefficient of thermal expansion for glass may be calculated at room temperature. In some embodiments, the coefficient of thermal expansion for glass is preferably calculated from a dilatometric curve. In some embodiments, the coefficient of thermal expansion for glass may be calculated using a temperature range that includes the temperatures at the macrocomposite is intended to be exhibited or stored (for example, a temperature range of 10 degrees Celsius (° C.) to 40° C. (283.15 Kelvin (K) to 313.15K). In some embodiments, the coefficient of thermal expansion for glass may be calculated using a temperature range from room temperature to a temperature 100° C. (373.15K) below the glass transition temperature ($T_g$). In some embodiments, the coefficient of thermal expansion for glass may be calculated at temperatures in a range from room temperature to the $T_g$ to the glass transition temperature ($T_g$). In some embodiments, the coefficient of thermal expansion for metal is preferably calculated at room temperature. In some embodiments, the coefficient of thermal expansion for metal is preferably calculated from a dilatometric curve. In some embodiments, the coefficient of thermal expansion for metal may be calculated using a temperature range that includes the temperatures at the macrocomposite is intended to be exhibited or stored (for example, a temperature range of 10° C. to 40° C. (283.15K to 313.15K)). In some embodiments, the coefficient of thermal expansion for metal may be calculated using a temperature range from room temperature to 300° C. (573.15K). In some embodiments, the coefficient of thermal expansion for metal may be calculated using a temperature range from room temperature to the $T_g$ of the glass present in the macrocomposite.

As used herein, "macrocomposite" refers to a combination of two different materials wherein a first material is dispersed or immersed, fully or partially, in a second material, and wherein the first material has a volume that may be seen by an unaided human eye. In some embodiments, the first material has a volume of greater than 0.1 millimeters cubed ($mm^3$), greater than 1 $mm^3$, greater than 10 $mm^3$, greater than 100 $mm^3$, greater than 1000 $mm^3$, or greater than 10000 $mm^3$. In some embodiments, the first material includes multiple pieces having a volume of greater than 0.1 $mm^3$, greater than 1 $mm^3$, greater than 10 $mm^3$, greater than 100 $mm^3$, greater than 1000 $mm^3$, or greater than 10000 $mm^3$.

As used herein, the viscosity values used are dynamic viscosity values.

As used herein, the glass transition temperature (also referred to herein as $T_g$) is the temperature at which the viscosity of a glass is $10^{13}$ decipascal-seconds (dPa·s).

As used herein, "Littleton softening point" is the temperature at which the viscosity of a glass is $10^{7.65}$ dPa·s.

As used herein, "room temperature" is 16° C. to 26° C. or, more preferably, 18° C. to 24° C. In some embodiments, "room temperature" is 20° C.

The terms "coupled" or "fixed" refer to elements of the macrocomposite being attached to each other directly (in direct contact with each other).

The words "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

The terms "comprises" and variations thereof do not have a limiting meaning where these terms appear in the description and claims.

Unless otherwise specified, "a," "an," "the," and "at least one" are used interchangeably and mean one or more than one.

Also herein, the recitations of numerical ranges by endpoints include all numbers subsumed within that range (for example, 1 to 5 includes 1, 1.5, 2, 2.75, 3, 3.80, 4, 5, etc.).

For any method disclosed herein that includes discrete steps, the steps may be conducted in any feasible order. And, as appropriate, any combination of two or more steps may be conducted simultaneously. As appropriate, steps may be omitted.

Unless otherwise indicated, all numbers expressing quantities of components, molecular weights, and so forth used in the specification and claims are to be understood as being modified in all instances by the term "about." Accordingly, unless otherwise indicated to the contrary, the numerical parameters set forth in the specification and claims are approximations that may vary depending upon the desired properties sought to be obtained by the present invention. At the very least, and not as an attempt to limit the doctrine of equivalents to the scope of the claims, each numerical parameter should at least be construed in light of the number of reported significant digits and by applying ordinary rounding techniques.

The above summary of the present invention is not intended to describe each disclosed embodiment or every implementation of the present invention. The description that follows more particularly exemplifies illustrative embodiments. In several places throughout the application, guidance is provided through lists of examples, which examples may be used in various combinations. In each instance, the recited list serves only as a representative group and should not be interpreted as an exclusive list.

DETAILED DESCRIPTION OF ILLUSTRATIVE EMBODIMENTS

Figure 1:
FIG. 1 shows a perspective view of a bronze disc, fully immersed and suspended in cast glass; made as described in Example 1.

This disclosure describes a macrocomposite that includes metal and glass and methods of making the macrocomposite. The metal may be dispersed or immersed, fully or partially, in the glass. The metal has a volume that may be seen by an unaided human eye. In some embodiments, the macrocomposite does not include an organic resin, an adhesive, or a polymer.

In some embodiments, the metal is uniformly dispersed in glass; in some embodiments, the metal is non-uniformly dispersed in glass. In some embodiments, the metal may include multiple pieces. In some embodiments, the metal is preferably visible. For example, the metal may be clearly visible to the human eye through the glass.

In some embodiments, the metal and the glass may be bound by chemical bonds. In some embodiments, the metal and the glass may be coupled. In some embodiments, the metal may be physically encased in a space defined by the glass. In some embodiments when the metal is encased in glass, the metal and the glass may be separated including for example, by a gas or by air. In some embodiments, at least a portion of the surface of the metal may be in intimate contact with the glass and/or fixed to the glass. In some embodiments, the entire surface of the metal may be in intimate contact with the glass and/or fixed to the glass.

Because of the mismatch of thermal and mechanical properties between common, commercially available silicate glass and metal, an organic resin or polymer is often used to bind the materials in metal-glass laminates or other visual structures of artistic character. Such a resin or polymer limits both the thickness of the composite and location of the metal within the composite. In addition, the resin or polymer may alter the optical appearance of the macrocomposite, in particular the color and light reflection or refraction of the macrocomposite. Moreover, polymers, as substances of far lower hardness, chemical, and thermal durability than glass, make composites obtained with the addition of metal more prone to scratches and undesired reactions with liquids or heat, which may spoil transparency or surface integrity of the composite. What is described herein is a high temperature method for producing metal-glass macrocomposites without using an organic resin, an adhesive, or a polymer.

Although, in some embodiments, a composition including the macrocomposite may further include an organic resin, an adhesive, or a polymer, the macrocomposite preferably does not include an organic resin, an adhesive, or a polymer. For example, an organic resin, an adhesive, or a polymer could be added to a macrocomposite for a protective effect or a design effect. In preferred embodiments, however, the macrocomposite itself does not include an organic resin, an adhesive, or a polymer; and an organic resin, an adhesive, or a polymer is not used to bind the metal and the glass and is not found at the metal-glass interface.

Due to the different nature of the chemical bonds that make up metal and make up the glass (for example, metal-metal bonds versus phosphorus-oxygen-phosphorous bonds of covalent-ionic character in phosphate glass), metals are often not wettable or not uniformly wettable with molten glasses. The conventional approach undertaken to address this reduced wettability has been to artificially create, or induce, a very thin oxide layer on the metal surface.

In many embodiments, phosphate glasses are preferable for use in making the metal-glass macrocomposites described herein. In some embodiments, when phosphate glasses are used, a thin phosphate layer on the metal surface may improve metal wettability. In many embodiments, the phosphate layer may provide improved wettability compared to an oxide layer. As described herein, in some embodiments, a thin film composition, such as a metal phosphate thin film composition may be used to prepare the metal surface. Other known techniques of metal surface treatment may additionally or alternatively be applied including, for example, vapor or gas or electrolytic deposition, forced oxidation, sulphurization, etc.

Another problem frequently encountered in the formation of macrocomposites of glass and metal are metal alloys that have a high affinity to glass (for example, zinc found in brass has such a high affinity). Strong affinity of metal, or a component of a metal alloy, to glass may result in at least partial dissolution of the metal or a metallic component of the metal alloy in glass. As a result of this reaction, a portion of the glass may crystallize, resulting in the appearance of opacity in the region bordering the metal. Additionally or alternatively, the product of a metal-glass reaction that does not dissolve in surrounding glass may cause the metal insert to swell, as the product of the reaction has higher volume than the original metal. In contrast, as described herein, in some embodiments, the metal insert may be coated with a protective film that protects the metal alloy against reaction with the glass during the time required for macrocomposite formation.

The macrocomposites described herein may be used in any suitable fashion. In some embodiments, the macrocomposites may be used in interior and/or exterior furnishings and/or in a decorative and/or architectural component including, for example, furniture, lighting, a lamp, a partition wall and/or a screen, a tile, a vase, a container, a reflective surface, an art object, a glass pane, and/or a three dimensional rigid structure.

The high thermal conductivity of metals allows the combination of a cooler (for example, room temperature) metal insert into hot glass (in a viscous state or even molten state and having temperatures of several hundred degrees Celsius). Because of the thermal conductivity, the temperature of the glass and the metal become equal within seconds. The very short time of the process allows even non-precious metals to avoid undergoing the oxidation that is characteristic to high temperature treatment of metals, and thus, after immersion in glass, the metals may preserve their unaltered surface for years. In this manner, the surface of copper, bronze, and even iron may shine. In addition, metals that have undergone surface modifications including, for example, rusted steel, preserve their unique characteristics after immersion in glass, because the process of further corrosion is halted or extensively slowed. Thus, in some embodiments, the methods described herein may provide the ability to arrest the appearance of a metal at the exact moment when an artist finishes the surface treatment. The glass matrix, where it covers the metal, may completely protect the metal from all environmental influence. The macrocomposite, wherein metal is partly covered by glass, and partly exposed to air, may allow simultaneous preservation of a metal in non-oxidized state and in a state of gradual oxidation by the environment.

In addition to the preservation of metal surface and protection from the influence of environment and temperature, glass-metal macrocomposites with glass matrix of high refractive index and inserts of metals with unprocessed surfaces (very often shaped in natural processes such as repeated dissolution and deposition, local crystallization, slow oxidation, slow corrosion, sulphurization, etc.), expose multiple light reflection, dispersion and refraction. Phosphate glasses exhibit a combination of required properties: low transformation temperatures, high expansion coefficients, and, as a special advantage, high refractive indices. Due to those properties ordinary metals such as oxidized copper, or rusty steel, which exhibit a matte and dull surface when exposed to air, acquire a lustrous sheen after insertion into a phosphate glass matrix. The change in visual quality is a result of the large optical density difference at the interfacial glass-to-metal boundary.

In many embodiments, common (unleaded) silicate glass is not suitable for use in a glass which forms the macrocomposites described herein including, for example, macrocomposites including gold, copper, bronze, silver or other metals in which the coefficient of thermal expansion is above a range of $85 \times 10^{-7}$ reciprocal kelvin ($K^{-1}$) to $100 \times 10^{-7} K^{-1}$. (For example, the coefficient of thermal expansion for gold is $142 \times 10^{-7} K^{-1}$; the coefficient of thermal expansion for copper is in a range of $160 \times 10^{-7} K^{-1}$ to $177 \times 10^{-7} K^{-1}$; the coefficient of thermal expansion for silver is $196 \times 10^{-7} K^{-1}$.) Other properties may further restrict the combination of the metals with common (unleaded) silicate glass. For example, some metals including, for example copper, bronze, and gold, have low melting temperatures.

Properties of the Glass

Any suitable glass may be used for the macrocomposites described herein. In some embodiments, the glass and metal preferably have matched coefficients of thermal expansion. In some embodiments, the difference in the coefficients of thermal expansion between the metal and the glass is preferably less than $30 \times 10^{-7} K^{-1}$, less than $25 \times 10^{-7} K^{-1}$, less than $20 \times 10^{-7} K^{-1}$, or less than $10 \times 10^{-7} K^{-1}$. The extent of the difference in the coefficients of thermal expansion may be selected based on the desire to prevent cracks or microcracks in the macrocomposite. As the difference in the coefficients of thermal expansion between the glass and the metal is increased, the likelihood of cracks or microcracks in the macrocomposite increases.

In certain embodiments, the thermal expansion coefficient of the glass must be at least at least at least $70 \times 10^{-7} K^{-1}$, at least $80 \times 10^{-7} K^{-1}$, at least $90 \times 10^{-7} K^{-1}$, at least $100 \times 10^{-7} K^{-1}$, at least $110 \times 10^{-7} K^{-1}$, or at least $120 \times 10^{-7} K^{-1}$, at least $130 \times 10^{-7} K^{-1}$, at least $140 \times 10^{-7} K^{-1}$, at least $150 \times 10^{-7} K^{-1}$, at least $160 \times 10^{-7} K^{-1}$, at least $170 \times 10^{-7} K^{-1}$, or at least $180 \times 10^{-7} K^{-1}$.

In some embodiments, the thermal expansion coefficient of the glass may preferably be chosen based on the thermal expansion coefficient of the metal.

In some embodiments, including, for example, when the metal includes copper (which has a thermal expansion coefficient in a range of $160 \times 10^{-7} K^{-1}$ to $177 \times 10^{-7} K^{-1}$), an aluminum bronze alloy, and/or a copper alloy (including, for example, alpacca, an alloy that includes copper, zinc, and nickel, and sometimes iron), the glass may have a thermal expansion coefficient of at least $120 \times 10^{-7} K^{-1}$, at least $125 \times 10^{-7} K^{-1}$, at least $130 \times 10^{-7} K^{-1}$, or at least $135 \times 10^{-7} K^{-1}$ and/or up to $170 \times 10^{-7} K^{-1}$, up to $175 \times 10^{-7} K^{-1}$, up to $180 \times 10^{-7} K^{-1}$, up to $185 \times 10^{-7} K^{-1}$, or up to $190 \times 10^{-7} K^{-1}$. In some embodiments, the glass may have a thermal expansion coefficient in a range of $130 \times 10^{-7} K^{-1}$ to $185 \times 10^{-7} K^{-1}$. In some embodiments, the glass may include the components shown in row 1 of Table 1. In some embodiments, the glass may include the ranges of the components shown in row 1 of Table 1. In some embodiments, the glass may include one of the compositions shown in row 1 of Table 1.

In some embodiments, including, for example, when the metal includes gold (which has a thermal expansion coefficient of $142 \times 10^{-7} K^{-1}$) and/or a gold alloy, the glass may have a thermal expansion coefficient of at least $110 \times 10^{-7} K^{-1}$, at least $115 \times 10^{-7} K^{-1}$, at least $120 \times 10^{-7} K^{-1}$, at least $125 \times 10^{-7} K^{-1}$, or at least $130 \times 10^{-7} K^{-1}$ and/or up to $165 \times 10^{-7} K^{-1}$, up to $170 \times 10^{-7} K^{-1}$, up to $175 \times 10^{-7} K^{-1}$, or up to $180 \times 10^{-7} K^{-1}$. In some embodiments, the glass may have a thermal expansion coefficient of $120 \times 10^{-7} K^{-1}$ to $175 \times 10^{-7} K^{-1}$. In some embodiments, the glass may include the components shown in row 2 of Table 1. In some embodiments, the glass may include the ranges of the components shown in row 2 of Table 1. In some embodiments, the glass may include one of the compositions shown in row 2 of Table 1.

In some embodiments, including, for example, when the metal includes at least one type of selected types of bronze (which typically have a thermal expansion coefficient in a range of $178 \times 10^{-7} K^{-1}$ to $212 \times 10^{-7} K^{-1}$), the glass may have a thermal expansion coefficient of at least $150 \times 10^{-7} K^{-1}$, at least $155 \times 10^{-7} K^{-1}$, at least $160 \times 10^{-7} K^{-1}$, at least $165 \times 10^{-7} K^{-1}$, at least $170 \times 10^{-7} K^{-1}$, or at least $175 \times 10^{-7} K^{-1}$ and/or up to $175 \times 10^{-7} K^{-1}$, up to $180 \times 10^{-7} K^{-1}$, up to $185 \times 10^{-7} K^{-1}$, or up to $190 \times 10^{-7} K^{-1}$. In some embodiments, the glass may have a thermal expansion coefficient in a range of $160 \times 10^{-7} K^{-1}$ to $185 \times 10^{-7} K^{-1}$. In some embodiments, the glass may include the components shown in row 3 of Table 1. In some embodiments, the glass may include the ranges of the components shown in row 3 of Table 1. In some embodiments, the glass may include one of the compositions shown in row 3 of Table 1.

In some embodiments, including, for example, when the metal includes iron, cast iron, steel, and/or carbon steel (which typically have a thermal expansion coefficient of $117 \times 10^{-7} K^{-1}$ for pure iron and in a range of $101 \times 10^{-7} K^{-1}$ to $117 \times 10^{-7} K^{-1}$ for carbon steel having a carbon concentration in a range of 1.45 weight percent (wt. %) carbon to 0.06 wt. % carbon), the glass may have a thermal expansion coefficient of at least $75 \times 10^{-7} K^{-1}$, at least $80 \times 10^{-7} K^{-1}$, at least $85 \times 10^{-7} K^{-1}$, at least $90 \times 10^{-7} K^{-1}$, or at least $75 \times 10^{-7} K^{-1}$, and/or up to $125 \times 10^{-7} K^{-1}$, up to $130 \times 10^{-7} K^{-1}$, up to $135 \times 10^{-7} K^{-1}$, up to $140 \times 10^{-7} K^{-1}$, or up to $145 \times 10^{-7} K^{-1}$. In some embodiments, the glass may have a thermal expansion coefficient in a range of $90 \times 10^{-7} K^{-1}$ to $140 \times 10^{-7} K^{-1}$.

In some embodiments, including, for example, when the metal includes stainless steel (which typically has a thermal expansion coefficient in a range of $99 \times 10^{-7} K^{-1}$ to $173 \times 10^{-7} K^{-1}$), the glass may have a thermal expansion coefficient of at least $75 \times 10^{-7} K^{-1}$, at least $80 \times 10^{-7} K^{-1}$, at least $85 \times 10^{-7} K^{-1}$, at least $90 \times 10^{-7} K^{-1}$, or at least $95 \times 10^{-7} K^{-1}$, and/or up to $170 \times 10^{-7} K^{-1}$, up to $175 \times 10^{-7} K^{-1}$, up to $180 \times 10^{-7} K^{-1}$, up to $185 \times 10^{-7} K^{-1}$, or up to $190 \times 10^{-7} K^{-1}$. In some embodiments, the glass may have a thermal expansion coefficient in a range of $90 \times 10^{-7} K^{-1}$ to $185 \times 10^{-7} K^{-1}$. In some embodiments, the glass may include the components shown in row 4 of Table 1. In some embodiments, the glass may include the ranges of the components shown in row 4 of Table 1. In some embodiments, the glass may include one of the compositions shown in row 4 of Table 1.

In some embodiments, including, for example, when the metal includes titanium (which typically has a thermal expansion coefficient of $84 \times 10^{-7} K^{-1}$ for 99.9 percent (%) Ti and $85 \times 10^{-7} K^{-1}$ for 99% Ti) and/or titanium alloys (which typically have a thermal expansion coefficient of $86.4 \times 10^{-7} K^{-1}$ for Ti-8Mn, $93.6 \times 10^{-7} K^{-1}$ for Ti-5Al2,5Sn), the glass may have a thermal expansion coefficient of at least $65 \times 10^{-7} K^{-1}$, at least $70 \times 10^{-7} K^{-1}$, at least $75 \times 10^{-7} K^{-1}$, at least $80 \times 10^{-7} K^{-1}$, or at least $85 \times 10^{-7} K^{-1}$, and/or up to $90 \times 10^{-7} K^{-1}$, up to $95 \times 10^{-7} K^{-1}$, up to $100 \times 10^{-7} K^{-1}$, up to $105 \times 10^{-7} K^{-1}$, or up to $110 \times 10^{-7} K^{-1}$. In some embodiments, the glass may have a thermal expansion coefficient of $75 \times 10^{-7} K^{-1}$ to $105 \times 10^{-7} K^{-1}$. In some embodiments, the glass may include the components shown in row 5 of Table 1. In some embodiments, the glass may include the ranges of the components shown in row 5 of Table 1. In some embodiments, the glass may include one of the compositions shown in row 5 of Table 1.

In some embodiments, the macrocomposite may include glass and more than one metal. In such embodiments, the difference of thermal expansion coefficients between the metals in the macrocomposite is preferably small. For example, the difference in the thermal expansion coefficients between the first metal and the second metal may be up to $10 \times 10^{-7} K^{-1}$, up to $15 \times 10^{-7} K^{-1}$, up to $20 \times 10^{-7} K^{-1}$, or up to $25 \times 10^{-7} K^{-1}$. In such embodiments, the glass preferably has a thermal expansion coefficient in the range between the thermal expansion coefficient of the first metal and the thermal expansion coefficient of the second metal.

For example, in some embodiments, including when the metal includes copper (which has a thermal expansion coefficient in a range of $160 \times 10^{-7} K^{-1}$ to $177 \times 10^{-7} K^{-1}$) and gold (which has a thermal expansion coefficient of $142 \times 10^{-7} K^{-1}$), the glass may have a thermal expansion coefficient of at least $110 \times 10^{-7} K^{-1}$, at least $115 \times 10^{-7} K^{-1}$, at least $120 \times 10 K^{-1}$, at least $125 \times 10^{-7} K^{-1}$, at least $130 \times 10^{-7} K^{-1}$, at least $135 \times 10^{-7} K^{-1}$, at least $140 \times 10^{-7} K^{-1}$, at least $142 \times 10^{-7} K^{-1}$, at least $145 \times 10^{-7} K^{-1}$, or at least $150 \times 10^{-7} K^{-1}$, and/or up to $155 \times 10^{-7} K^{-1}$, up to $160 \times 10^{-7} K^{-1}$, up to $165 \times 10^{-7} K^{-1}$, up to $167 \times 10^{-7} K^{-1}$, up to $170 \times 10^{-7} K^{-1}$, up to $175 \times 10^{-7} K^{-1}$, or up to $180 \times 10^{-7} K^{-1}$. In some embodiments, the glass preferably has a thermal expansion coefficient between the thermal expansion coefficient of gold and the thermal expansion coefficient of copper. In some embodiments, the glass may have a thermal expansion coefficient in a range of $142 \times 10^{-7} K^{-1}$ to $167 \times 10^{-7} K^{-1}$, in a range of $145 \times 10^{-7} K^{-1}$ to $155 \times 10^{-7} K^{-1}$, or in a range of $150 \times 10^{-7} K^{-1}$ to $155 \times 10^{-7} K^{-1}$.

TABLE 1

| Glass Application | Component | Specific Composition Example (1) | | Specific Composition Example (2) | | Specific Composition Example (3) | | Broad acceptable % ranges for components | |
| --- | --- | --- | --- | --- | --- | --- | --- | --- | --- |
| | | Amount (mol %) | Amount (mass %) | Amount (mol %) | Amount (mass %) | Amount (mol %) | Amount (mass %) | Component | Amount (mol %) Range |
| Aluminum Bronze Alloys, Copper, and/or Copper Alloys | ZnO | 41.60 | 34.19 | 41.60 | 34.40 | 47.25 | 38.49 | ZnO | 40.0-47.5 |
| | $P_2O_5$ | 31.90 | 45.74 | 31.40 | 45.30 | 31.25 | 44.40 | $P_2O_5$ | 29.5-33.5 |
| | $Al_2O_3$ | 1.25 | 1.29 | 1.75 | 1.81 | 1.25 | 1.28 | $Al_2O_3$ | 0.5-2.0 |
| | $TiO_2$ | 0.25 | 0.20 | 0.25 | 0.20 | 0.25 | 0.20 | $TiO_2$ | 0.1-1.5 |
| | $Na_2O$ | 10.07 | 6.30 | 11.33 | 7.14 | 10.00 | 6.20 | $Na_2O$ | 7.5-12.5 |
| | $K_2O$ | 9.93 | 9.45 | 8.67 | 8.30 | 10.00 | 9.43 | $K_2O$ | 7.5-12.5 |
| | CaO | 5.00 | 2.83 | 5.00 | 2.85 | | | CaO | 0-7.0 |

TABLE 1-continued

| Glass Application | Component | Specific Composition Example (1) | | Specific Composition Example (2) | | Specific Composition Example (3) | | Broad acceptable % ranges for components | |
|---|---|---|---|---|---|---|---|---|---|
| | | Amount (mol %) | Amount (mass %) | Amount (mol %) | Amount (mass %) | Amount (mol %) | Amount (mass %) | Component | Amount (mol %) Range |
| Gold and/or gold alloys | ZnO | 43.84 | 35.39 | 46.87 | 38.16 | | | ZnO | 42.5-47.5 |
| | $P_2O_5$ | 32.75 | 46.12 | 31.14 | 44.21 | | | $P_2O_5$ | 30.0-33.5 |
| | $Al_2O_3$ | 1.46 | 1.48 | 1.80 | 1.84 | | | $Al_2O_3$ | 1.0-2.0 |
| | $TiO_2$ | 0.49 | 0.39 | 0.20 | 0.16 | | | $TiO_2$ | 0.2-1.0 |
| | $Na_2O$ | 10.73 | 6.60 | 10.00 | 6.20 | | | $Na_2O$ | 6.0-12.5 |
| | $K_2O$ | 10.73 | 10.03 | 10.00 | 9.43 | | | $K_2O$ | 6.0-12.5 |
| | CaO | | | | | | | CaO | 0-7.0 |
| Bronze | ZnO | 40.28 | 33.10 | 41.20 | 33.79 | | | ZnO | 40.0-42.0 |
| | $P_2O_5$ | 31.97 | 45.84 | 31.95 | 45.71 | | | $P_2O_5$ | 31.0-33.0 |
| | $Al_2O_3$ | 1.75 | 1.80 | 1.59 | 1.63 | | | $Al_2O_3$ | 1.25-2.0 |
| | $TiO_2$ | 0.25 | 0.20 | 0.25 | 0.20 | | | $TiO_2$ | 0.2-0.30 |
| | $Na_2O$ | 12.58 | 7.88 | 10.94 | 6.84 | | | $Na_2O$ | 10.0-15.0 |
| | $K_2O$ | 9.67 | 9.20 | 10.10 | 9.59 | | | $K_2O$ | 8.0-11.0 |
| | CaO | 3.50 | 1.98 | 3.98 | 2.25 | | | CaO | 0.0-5.0 |
| Steel (ordinary) | ZnO | 49.50 | 40.15 | 49.33 | 40.19 | 46.60 | 38.37 | ZnO | 46.0-49.5 |
| | $P_2O_5$ | 32.00 | 45.28 | 31.67 | 44.96 | 31.40 | 45.10 | $P_2O_5$ | 31.0-33.0 |
| | $Al_2O_3$ | 2.00 | 2.03 | 2.00 | 2.04 | 1.75 | 1.81 | $Al_2O_3$ | 1.25-3.0 |
| | $TiO_2$ | 0.50 | 0.40 | 0.50 | 0.40 | 0.25 | 0.20 | $TiO_2$ | 0.2-1.5 |
| | $Na_2O$ | 9.00 | 5.56 | 8.00 | 4.96 | 8.00 | 5.02 | $Na_2O$ | 6.0-11.0 |
| | $K_2O$ | 7.00 | 6.57 | 7.00 | 6.60 | 7.00 | 6.67 | $K_2O$ | 5.0-10.0 |
| | CaO | | | 1.50 | 0.84 | 5.00 | 2.84 | CaO | 0.0-5.0 |
| Titanium | ZnO | 49.50 | 40.66 | 48.75 | 40.01 | | | ZnO | 48.0-50.0 |
| | $P_2O_5$ | 31.25 | 44.78 | 31.25 | 44.73 | | | $P_2O_5$ | 31.0-33.0 |
| | $Al_2O_3$ | 1.00 | 1.03 | 2.00 | 2.06 | | | $Al_2O_3$ | 1.0-2.0 |
| | $TiO_2$ | 1.75 | 1.41 | 1.00 | 0.81 | | | $TiO_2$ | 0.1-3.0 |
| | $Na_2O$ | 8.00 | 5.01 | 8.00 | 5.00 | | | $Na_2O$ | 6.0-9.0 |
| | $K_2O$ | 6.00 | 5.71 | 6.00 | 5.70 | | | $K_2O$ | 5.0-9.0 |
| | CaO | 2.50 | 1.42 | 3.00 | 1.70 | | | CaO | 0.0-6.0 |

Among glasses possessing a suitable thermal expansion coefficient, glasses with lower transition temperatures may be, in some embodiments, preferable. That is, glass may be selected based on (1) thermal expansion coefficient, (2) glass transition temperature ($T_g$), and/or (3) the refractive index of the glass. In a preferred embodiment, a glass is selected such that the glass shifts into a low viscous state at a temperature less than the temperature where the integrity of the other material in the macrocomposite (metal) may be compromised. Because, as further discussed below, in some embodiments, during formation of the macrocomposite, the metal and glass are at the same temperature and the glass is at a temperature between the temperature of the melting point of the glass and the glass transition temperature ($T_g$) of the glass, it may be preferred to select a glass with a low $T_g$ and a low melting point to protect the integrity of the metal. In some embodiments the $T_g$ of selected glass will be up to 550° C., up to 500° C., up to 450° C., up to 400° C., up to 350° C., or up to 300° C. In some embodiments, it is preferred to select a glass having a relatively high refractive index.

For isotropic materials, including glass and metal, the volumetric coefficient is roughly equal to three times the linear coefficient. In embodiments in which the metal is solid at the time of dispersing or immersing the metal in the glass, its shrinkage (as an effect of cooling), may be immediately compensated by glass flow into the area. In embodiments in which the metal is a liquid at the time of dispersing or immersing the metal in the glass, the metal transforms into a solid within seconds after pouring of a cast metal into viscous glass and again, any shrinkage (as an effect of cooling), may be immediately compensated by glass flow into the area. The glass will continue to flow into any area created by metal shrinkage until the glass cools to the glass transition temperature. Because glass and metal are at about the same temperature when the glass reaches its $T_g$ (due to the higher heat conductivity coefficient of metal, heat transfer through a glass/metal boundary reaches equilibrium in a short time, as long as volume of metal and its heat capacity is smaller than glass). As long as heat is transferred to metal in the macrocomposite through a glass layer, both materials will have the same temperature during the entire cooling period (assuming a properly set cooling rate) down to room temperature. Thus, the identity of dilatometric characteristics (including changes in the coefficient of thermal expansion as a function of temperature) of glass and metal from the $T_g$ of glass to room temperature is of importance in glass-metal macrocomposite making. In certain embodiments, it is preferred that the difference in the coefficient of thermal expansion of the metal and the coefficient of thermal expansion of the glass is determined from $T_g$ of the glass to room temperature. In some embodiments, the difference in the coefficient of thermal expansion of the metal and the coefficient of thermal expansion of the glass may be determined at room temperature and/or a working temperature range (that is, the temperature at which the macrocomposite is intended to be stored and/or exhibited).

In some embodiments, the components of the glass are varied to attain a coefficient of thermal expansion and a glass transition temperature that fulfill the above-described features. In some embodiments, the glass includes a phosphate glass including, for example, a zinc phosphate glass, a borophosphate glass, a sulfophosphate glass, an iron phosphate glass, etc. In some embodiments, the glass includes a silicate glass including, for example, a lead silicate glass. In some embodiments, the glass does not include a silicate glass. In some embodiments, the glass includes zinc phosphate glass as a major component. In some embodiments, the glass includes borophosphate glass as a major component. In some embodiments, the glass includes sulfophosphate glass as a major component. In some embodiments, the glass includes iron phosphate glass as a major component. In some embodiments, the glass includes lead silicate glass as a major component. In some embodiments, the glass includes a high-leaded silicate glass, an aluminosilicate glass, a silicate-borate glass, a borosilicate glass, or boroaluminate glass. In some embodiments, the glass includes at least one of calcium, magnesium, barium, strontium, tin, bismuth, titanium, zirconium, erbium, neodymium, cerium, germanium, aluminum, sodium, potassium, and lithium.

In some embodiments, the glass preferably includes a phosphate glass. Due to high thermal expansion coefficient values typical for most metals, and their oxidation tendency at high temperatures, a phosphate glass may, in some embodiments, be best suited for metal glass macrocomposites. In some embodiments, phosphate glasses may exhibit a combination of desired properties including, for example, low glass transition temperatures, high expansion coefficients, and/or high refractive indices. In some embodiments, a high refractive index may be defined as a refractive index greater than the refractive index of common soda-lime glass (for example, a float glass), for which the index of refraction (Nd) is in the range of 1.51 to 1.52. In some embodiments, the coefficient of thermal expansion for a phosphate glass may be preferably calculated using a temperature range from room temperature to 300° C. In some embodiments, the coefficient of thermal expansion for a phosphate glass may be in a range of $90 \times 10^{-7} K^{-1}$ to $185 \times 10^{-7} K^{-1}$, in a range of $130 \times 10^{-7} K^{-1}$ to $185 \times 10^{-7} K^{-1}$, in a range of $120 \times 10^{-7} K^{-1}$ to $175 \times 10^{-7} K^{-1}$, in a range of $160 \times 10^{-7} K^{-1}$ to $185 \times 10^{-7} K^{-1}$, in a range of $90 \times 10^{-7} K^{-1}$ to $140 \times 10^{-7} K^{-1}$, or in a range of $75 \times 10^{-7} K^{-1}$ to $105 \times 10^{-7} K^{-1}$.

In some embodiments, the glass includes, expressed in mole percents, a range of 0% to 20% $Na_2O$, a range of 0% to 20% $K_2O$, a range of 0% to 20% $Li_2O$, a range of 0% to 7% of CaO, a range of 29.50% to 34% $P_2O_5$, a range of 38% to 50% ZnO, a range of 0% to 3% $Al_2O_3$, a range of 0% to 3% $Bi_2O_3$, a range of 0% to 2% $CeO_2$, a range of 0% to 5% BaO, a range of 0% to 5% MgO, a range of 0.1% to 3% $TiO_2$, a range of 0% to 2% of $ZrO_2$, and/or of 0 to 2% of $SnO_2$. In some embodiments, the glass further includes $Na_2O+K_2O+Li_2O$ in a range of 11% to 25%. In some embodiments, the glass further includes CaO+BaO+MgO in a range of 0% to 8%. In some embodiments, the glass further includes CaO+BaO+MgO+ZnO in a range of 38% to 55%. In some embodiments, the glass further includes $Al_2O_3+ZrO_2+CeO_2+TiO_2+SnO_2$ in a range of 0.1% to 6%. In some embodiments, the glass further includes $Al_2O_3+ZrO_2+CeO_2+TiO_2+SnO_2+P_2O_5$ in a range of 29.6% to 36%.

In some embodiments, the glass includes, expressed in mole percents, $Na_2O$ in a range of 0% to 5%, $K_2O$ in a range of 0% to 5%, $Li_2O$ in a range of 0% to 5%, $P_2O_5$ in a range of 38% to 42%, ZnO in a range of 45% to 52%, $Al_2O_3$ in a range of 0% to 2%, $Bi_2O_3$ in a range of 0% to 3%, $CeO_2$ in a range of 0% to 2%, $TiO_2$ in a range of 3% to 10%, $ZrO_2$ in a range of 0% to 1%, and/or $SnO_2$ in a range of 0 to 2%. In some embodiments, the glass further includes $Na_2O+K_2O+Li_2O$ in a range of 1% to 6%. In some embodiments, the glass further includes $Al_2O_3+ZrO_2+CeO_2+TiO_2+SnO_2$ in a range of 3% to 10%.

In some embodiments, the glass composition includes the components and/or amounts shown in Table 1, Table 2, or Table 3.

In some embodiments, including, for example, when the macrocomposite includes gold, copper, and/or bronze and glass, the glass composition may include the components and/or amounts shown in Table 2.

In some embodiments, including, for example, when the macrocomposite includes titanium and titanium alloys and glass, the glass composition may include the components and/or amounts shown in Table 2.

In some embodiments, including, for example, when the macrocomposite includes tungsten, the glass composition may include the components and/or amounts shown in Table 3.

In some embodiments, a glass composition for use in a macrocomposite may be selected according to the following guidelines.

As further discussed above, the components of the glass composition may be selected and tuned to alter the coefficient of thermal expansion of the glass composition and/or the $T_g$ of the glass composition. In some embodiments, the coefficient of thermal expansion of the glass composition and/or the $T_g$ of the glass composition may be determined by dilatometric analysis.

In some embodiments, the glass composition includes a zinc phosphate glass including $ZnO:P_2O_5$ at a molar ratio of 2:1. In some embodiments, for example, the glass may include 66.6 mol % of ZnO and 33.4 mol % of $P_2O_5$. In some embodiments, a zinc phosphate glass having the indicated molar ratio exhibits a decreased tendency of crystallization for two component $xZnO (1-x)P_2O_5$ glasses. $Na_2O$, $K_2O$, $Li_2O$, CaO, MgO, BaO may be substituted for ZnO on a molar basis and $Al_2O_3$, $TiO_2$, $CeO_2$, $ZrO_2$, $Bi_2O_3$, $SnO_2$ may be substituted for $P_2O_5$ on a molar basis so long as the molar ratio of the sum of ($\Sigma$) (ZnO, CaO, MgO, BaO, $Na_2O$, $K_2O$, $Li_2O$) to $\Sigma(P_2O_5, Al_2O_3, TiO_2, ZrO_2, CeO_2, Bi_2O_2, SnO_2)$ is maintained at 2:1.

In some embodiments, wherein the glass composition includes ZnO and $P_2O_5$, the combined mass percent (also referred to herein as weight percent) of ZnO and $P_2O_5$ is at least 60, at least 70, at least 75, or at least 80.

In some embodiments, the O/P atomic ratio of the glass composition may be in a range of 3.5 to 4.0. In some embodiments, the O/P atomic ratio should be kept closer to 3.5 when pyrophosphates are included. In some embodiments, the O/P atomic ratio should be kept closer to 4.0 when orthophosphates are included In some embodiments, mixed oxides may be used. For example, $Na_2O$ and $K_2O$ may be used in similar concentrations. Without wishing to be bound by theory, it is believed that using mixed oxides may prevent glass crystallization.

In some embodiments, $K_2O$ may be used instead of $Na_2O$ to increase the coefficient of thermal expansion of the glass composition.

In some embodiments, $TiO_2$ may be included in the glass composition to decrease the coefficient of thermal expansion of the glass composition.

In some embodiments, $Al_2O_3$ and/or $TiO_2$ may be included in the glass composition. Without wishing to be bound by theory, it is believed that $Al_2O_3$ and/or $TiO_2$ may increase chemical resistance of the glass composition (including, for example, to water and/or moisture).

In some embodiments, CaO, BaO, and/or MgO may be substituted for a portion of the ZnO in the glass composition. Without wishing to be bound by theory, it is believed that such a substitution may increase chemical resistance of the glass composition (including, for example, to water and/or moisture).

In some embodiments, clear glass (instead of glass with seeds or bubbles) is preferred. In embodiments where seeding and/or bubbling is not preferred, the glass may preferably not include dissolved gases including, for example, $CO_2$ or $SO_2$. Thus, in some embodiments, no carbonate or sulfate is including in the glass. In some embodiments, the glass is clear enough that the metal is visible.

In some embodiments, the glass composition preferably does not include a carbonate. In some embodiments, the glass composition preferably does not include a sulfate. In some embodiments, the glass composition preferably does not include $(NH_4)_3PO_4$.

TABLE 2

|  | mole percent |
|---|---|
| $Na_2O$ | 0-20 |
| $K_2O$ | 0-20 |
| $Li_2O$ | 0-20 |
| $Na_2O + K_2O + Li_2O$ | 11-25 |
| $P_2O_5$ | 29.50-34 |
| ZnO | 38-50 |
| CaO | 0-7 |
| BaO | 0-5 |
| MgO | 0-5 |
| CaO + BaO + MgO | 0-8 |
| CaO + BaO + MgO + ZnO | 38-55 |
| $Al_2O_3$ | 0-3 |
| $ZrO_2$ | 0-2 |
| $Bi_2O_3$ | 0-3 |
| $CeO_2$ | 0-2 |
| $TiO_2$ | 0.1-3 |
| $SnO_2$ | 0-2 |
| $Al_2O_3 + ZrO_2 + CeO_2 + TiO_2 + SnO_2$ | 0.1-6 |
| $Al_2O_3 + ZrO_2 + CeO_2 + TiO_2 + SnO_2 + P_2O_5$ | 29.6-36 |

TABLE 3

|  | mole percent |
|---|---|
| $Na_2O$ | 0-5 |
| $K_2O$ | 0-5 |
| $Li_2O$ | 0-5 |
| $Na_2O + K_2O + Li_2O$ | 1-6 |
| $P_2O_5$ | 38-42 |
| ZnO | 45-52 |
| $Al_2O_3$ | 0-2 |
| $Bi_2O_3$ | 0-3 |
| $CeO_2$ | 0-2 |
| $TiO_2$ | 3-10 |
| $SnO_2$ | 0-2 |
| $ZrO_2$ | 0-1 |
| $Al_2O_3 + CeO_2 + TiO_2 + ZrO_2 + SnO_2$ | 3-10 |

In some embodiments, compounds of elements which may exist in two or more oxidation states in glass are added, such as SnO, $SnO_2$, $CeO_2$, etc., to create an aesthetically desirable surface interaction on copper or another metal. Metal surface modification may also be obtained as a result of the reaction of the metal with elements, which are used to form alloys. For example, copper surface modification may be obtained as a result of the reaction of copper with elements, which are used to form alloys of copper. In some embodiments, zinc, tin, titanium, bismuth and/or aluminum may be added to the glass composition to obtain this effect.

In some embodiments, the glass includes compounds to increase the refractive index of glass in the macrocomposite. The high refractive index may be considered a desirable property of glass in the macrocomposite. In some embodiments, bismuth oxide, titanium oxide, or lead oxides may be added to increase the refractive index. In some embodiments, bismuth oxide or titanium oxide are preferably added. In some embodiments, the glass may be enriched with neodymium, praseodymium, erbium, cerium, titanium, or a mixture thereof, to modify optical properties of glass in the macrocomposite, for example to obtain a dichroism effect.

In some embodiments, an element possessing an absorption band within the visible spectrum may be added to glass to modify the transmittance of light through the glass by selective absorption in some range of the spectrum. For example, the glass may include one or more oxides or other compounds of iron, copper, chromium, cobalt, nickel, cadmium, selenium, manganese, lanthanum, neodymium, praseodymium, erbium, vanadium, uranium, or mixtures thereof. The element possessing an absorption band within the visible spectrum may be selected by a skilled artisan depending on the desired coloring of the metal and glass within the macrocomposite.

In some embodiments, the glass may include some degree of opalescence. Such opalescence may be obtained, for example, by controlled crystallization or phase separation. For example, the glass may include fluoride, zirconium, a titanium oxide, a tin oxide, or a calcium oxide in an amount over the saturation solubility of the glass. Phase separation effect occurs as a result of the introduction of different glass former oxides, for example silicon dioxide or suitable silicate into phosphate glass, phosphorus pentoxide or suitable phosphate into silicate glass, boron trioxide or suitable borate into phosphate glass, or phosphorus pentoxide or suitable phosphate into borate glass.

In some embodiments, a metal-glass macrocomposite may be encased in one or more additional glasses. For example, a second glass, a third glass, a fourth glass, etc. may form an additional layer on a metal-glass macrocomposite. In some embodiments, the layers of glass may have increasing or decreasing thermal expansion coefficients.

Properties of the Metal

The metal may include any suitable metal and/or alloy or combination of metals and/or alloy. In some embodiments, the metal may include at least one of a copper; a native copper; a copper alloy including, for example, a brass, a bronze, an aluminum bronze, alpacca, and a cupronickel; iron; an iron alloy including, for example, cast iron and steel; titanium; titanium alloys; other elemental metals, including, for example, nickel, tungsten, gold, silver, neodymium and platinum; and other alloys including, for example, gold alloys, carbon steel, stainless steel, nickel silver, and inconel.

The metal of the macrocomposite may be in any suitable form that may be embedded in glass. The metal may be fully embedded, loosely enclosed wherein the metal moves freely inside the glass, or partially embedded in the glass, wherein part of the metal is enclosed in glass and part of the metal protrudes from the glass. The metal may be, for example, in any manmade shape, including for example: a plate, a foil, a stripe, a wire, a fiber, a net, a mesh, a chopped strand, a bowl, a grain, a sphere, a microsphere, a fabric, a flake, and/or an irregular shape. In some embodiments, the metal in the macrocomposite may be an irregular shape dictated by the behavior of the metal when the metal is molten including, for example, the behavior of molten metal when incorporated into the macrocomposite. The metal may be in a shape obtained in natural conditions, such as native copper. The metal may be in a shape obtained by a chemical process, such as the electrolysis of a copper salt, for example in copper sulfate solution. The metal may be in a shape obtained by electrolysis and/or electrowinning. The metal may be in an amorphous shape dictated by its behavior when molten. The metal may be in the shape of filaments or bands, obtained as a result of the interaction of molten metal and glass at a temperature greater than the $T_g$ of glass. The metal may be in continuous pieces or chopped.

In some embodiments, a metal insert may be ground and/or polished to a required thickness and/or surface texture. In some embodiments, the metal component may be ground and/or polished to a required thickness and/or surface texture before joining with the glass.

Formation of the Macrocomposite

Any suitable formation technique that includes dispersing or immersing the metal in glass, fully or partially, may be used to form the macrocomposites described herein. In some embodiments, the methods are high temperature methods, that is, methods that use temperatures within the range of glass manufacture and processing.

The process of macrocomposite preparation is complicated by the chemical and physical properties and limitations of the components involved. Typically, a metal-glass macrocomposite formation process starts with at least one component in a liquid state and results in one solid final item. For some embodiments, including when macrocomposite formation involves contact between molten glass and molten metal, the viscosity of molten glass at the time and temperature of contact may be orders of magnitude higher than the viscosity of molten metal. Moreover, although metal transformation from liquid to solid happens at one precisely defined temperature (metal crystallization is first order thermodynamic transition), glass behaves quite differently, with viscosity increasing continuously as the temperature decreases.

The formation of a metal-glass macrocomposite may also be problematic due to the large difference in coefficient of heat conductivity for glass and metal. At the temperatures selected during macrocomposite formation, when phosphate glass is used, heat transfer by conduction dominates the effect of radiation. When cold metal is put into molten glass, it quickly absorbs heat from the surrounding glass. Thus, as further described below, in some embodiments, the metal and/or a mold in which the macrocomposite is formed may be thermally pretreated.

Furthermore, if the temperature of the glass around a glass-metal boundary falls below the glass transition temperature during any step of macrocomposite processing (including from dispersing or immersing the metal in the glass to the start of the annealing process), the glass may break or endure micro-cracking, a danger that-increases with the increase in the coefficient of thermal expansion of the glass.

In some embodiments, the metal may be pretreated in a solution including an acid, a hydroxide, a salt, a molten salt, and/or a molten salt mixture just prior to dispersing or immersing the metal in the glass. In some embodiments, the metal may be pretreated in a low temperature glass melt. In some embodiments, the metal may be treated in a phosphate solution just prior to dispersing or immersing the metal in the glass. In some embodiments the phosphate solution is a zinc phosphate solution or an aluminum phosphate solution. In some embodiments, the zinc solution may be, for example, an aqueous $Zn(H_2PO_4)_2$ solution. The pH of the solution may be adjusted by the addition of $H_3PO_4$. In some embodiments, the pH is adjusted to attain highest salt concentration. In some embodiments, the aluminum phosphate solution may be, for example, an aqueous $Al(H_2PO_4)_3$ solution, or a solution including another polar solvent. In some embodiments the solvent is selected to promote high salt concentration.

In some embodiments, the temperature of the metal while immersed in a zinc phosphate solution or an aluminum phosphate solution may be up to 25° C., up to 50° C., up to 75° C., up to 100° C., up to 110° C., up to 120° C., up to 130° C., up to 140° C., or up to 150° C. less than the temperature of the glass at the time of dispersing or immersing the metal in the glass.

In some embodiments, the metal may be exposed to the phosphate solution for up to 0.5 second, up to 1 second, up to 2 seconds, up to 3 seconds, up to 4 seconds, up to 5 seconds, up to 6 seconds, up to 7 seconds, up to 8 seconds, up to 9 seconds, up to 10 seconds, up to 20 seconds, up to 30 seconds, or up to 1 minute. In some embodiments, the metal may be exposed to the phosphate solution for at least 0.1 second, at least 1 seconds, at least 2 seconds, or at least 5 seconds.

In some embodiments, treatment of a metal in a zinc phosphate solution or an aluminum phosphate solution may result in increased binding between the metal and a phosphate glass.

The temperature difference between the metal and the molten glass at the time of dispersing or immersing the metal in the glass may be selected based on the thermal characteristic of the metal and glass, as well as the tendency of the metal to change surface appearance at a given temperature.

In some embodiments, the metal may be at room temperature at the time of dispersing or immersing the metal in the glass.

In some embodiments, the metal may be heated to a temperature within 10° C., within 20° C., within 30° C., within 40° C., within 50° C., within 100° C., within 200° C., within 300° C., within 400° C., within 500° C., within 600° C., within 700° C., or within 800° C. of the temperature of the glass at the time of dispersing or immersing the metal in the glass. In some embodiments, the temperature may be lower than the temperature of the glass. In some embodiments, the temperature of the metal may be higher than the temperature of the glass.

In some embodiments, the metal may be in a molten state at the time of dispersing or immersing the metal in the glass.

In some embodiments, the method includes pretreating the metal before contacting the metal in the glass. In some embodiments, the metal may be preheated to a temperature of up to 50° C., up to 100° C., up to 150° C., or up to 200° C. In some embodiments, however, preheating the metal may not be advantageous because of the effect of metal oxidation on the desired visual qualities. In some embodiments, the maximal temperature of metal preheating must be selected to prevent undesired surface reaction with the atmosphere (including, for example, oxidation). The upper temperature limit may be selected based on thermodynamic data for metal-oxygen reactions known to a person having ordinary skill in the art.

In some embodiments, the glass may be heated prior to dispersing or immersing the metal in the glass. In some embodiments, glass may be heated prior to dispersing or immersing the metal in the glass to, for example, hold or to re-establish the temperature needed for the shaping of the glass. In some embodiments, the glass may be preheated in an auxiliary furnace. In some embodiments, the glass may be preheated in a glazed porcelain crucible or a fused quartz crucible.

In some embodiments, the temperature of the glass immediately prior dispersing or immersing the metal in the glass metal or at the time of dispersing or immersing the metal in the glass is sufficient to obtain a glass viscosity of up to $10^3$ dPas, up to $10^4$ dPas, up to $10^5$ dPas, or up to $10^6$ dPas. For example, the glass may be heated prior to contacting the metal to a temperature sufficient to obtain a glass viscosity up to $10^3$ dPas, when a viscosity of $10^3$ dPas is used during pressing or rolling. For example, the glass may be heated prior to contacting the metal sufficient to obtain a glass viscosity up to $10^5$ Pas, when a viscosity of $10^5$ dPas is used during pressing or rolling.

In some embodiments, at the time of dispersing or immersing the metal in the glass, the glass used in a macrocomposite may preferably be at a temperature between the temperature of the melting point of the glass and the glass transition temperature ($T_g$) of the glass.

In some embodiments, the temperature of the glass at the time of dispersing or immersing the metal in the glass (or immediately prior to contact with the metal) is at least 20° C. greater than the $T_g$ of the glass, at least 30° C. greater than the $T_g$ of the glass, or at least 40° C. greater than the $T_g$ of the glass. In some embodiments, the temperature of the glass at the time of dispersing or immersing the metal in the glass is at least 390° C., at least 400° C., or at least 410° C., at least 450° C., at least 500° C., at least 550° C., at least 600° C., at least 650° C., at least 700° C., at least 750° C., at least 800° C., at least 850° C., or at least 900° C.

In some embodiments, the temperature difference between the glass and metal at the time of dispersing or immersing the metal in the glass may preferably be minimal. In some embodiments, the temperature of the glass and metal at the time of dispersing or immersing the metal in the glass may be equal or within 3° C., within 5° C., within 10° C., within 15° C. To decrease the temperature difference between the metal and the glass at the time of dispersing or immersing the metal in the glass, the metal may, in some embodiments, be preheated.

In some embodiments, including, for example, where the risk of surface oxidation of the metal is high, the temperature of the metal may be lower than the temperature of the glass at the time of dispersing or immersing the metal in the glass. In some embodiments, the temperature difference between the metal and the glass metal at the time of dispersing or immersing the metal in the glass may be up to 900° C., up to 800° C., up to 600° C., up to 400° C., or up to 200° C. In some embodiments, the temperature difference between the metal and the glass metal at the time of dispersing or immersing the metal in the glass may be at least 100° C., at least 200° C., at least 300° C., at least 400° C., at least 500° C., at least 600° C., at least 700° C., or at least 800° C.

In some embodiments, heat conducting bridges (including, for example, heat-conducting supports, molds, and tools) may be avoided between metal containing areas of the macrocomposite during manufacture.

Because metal and glass may have significantly different thermal conductivities, in some embodiments such differences may cause temperature gradients and cracking as a result of thermal shock, even at ambient temperatures, of a glass-metal macrocomposite wherein the metal is only partially encased in glass. Thus, in some embodiments, including where metal and glass have significantly different thermal conductivities or where metal has a large volume relative to the volume of the glass, it may be preferable to fully encase a metal insert in glass, allowing heat to be more slowly transferred to the metal, due to the glass matrix surrounding the metal. In contrast to the direct transfer of heat from air to metal—which may cause the metal to reach a higher or lower temperature at a faster rate—the indirect transfer of heat to metal through glass may prevent thermal shock and breakage of the macrocomposite.

A shaping technique may be chosen based on the required characteristic of the macrocomposite shape and/or surface appearance or finishing. For example, a glass surface of the macrocomposite may be formed by surface tension of liquid glass while casting or free blowing (without the use of molds). When the glass surface requires a special surface texture or pattern, rolling may be used, or pressing, blowing, casting, or fusing into a mold. A combined or multistep process may be applied to obtain more complex results, such as for the creation of interlacing three-dimensional structures of glass and metal. In some embodiments, sintering process of a crushed or powdered glass may be used to obtain glass-metal macrocomposite shapes. In some embodiments, a crushed or powdered glass may be heated to a temperature from its softening point to its melting point, decreasing the viscosity of the crushed or powdered glass and allowing it to take the shape of the mold. In some embodiments, frit, fiber, or strips of glass may replace crushed or powdered glass. Powder, frit, fiber, or strips of glass may also be used to fill natural or artificial voids inside the metal, or to combine separate metal elements into one rigid item.

In some embodiments, a metal-glass macrocomposite may be manufactured by casting, blowing, pressing, rolling, or fusing the glass. In some embodiments, the temperature of the glass at the time of forming a glass-metal seal preferably corresponds to a viscosity value adequate for selected shaping technique. For example the temperature of the glass at the time of forming a glass-metal seal may correspond to a viscosity value of at least $10^2$ dPas, at least $10^3$ dPas, at least $10^4$ dPas, at least $10^5$ dPas, or at least $10^6$ dPas, and/or up to $10^4$ dPas, up to $10^5$ dPas, up to $10^6$ dPas, up to $10^7$ dPas, up to $10^8$ dPas, or up to $10^9$ dPas. For example, a range of $10^2$ dPas to $10^8$ dPas for casting; a range of $10^3$ dPas to $10^5$ dPas for blowing; a range of $10^3$ dPas to $10^8$ dPas for pressing or rolling. In some embodiments, an adequate viscosity value for casting is defined by maintaining molten glass fluidity sufficient to fill a mold volume and/or desired form segments. In some embodiments, an adequate viscosity value for pressing and rolling is defined by the ability of the glass to maintain shape immediately after contact with the rolling or pressing device. In some embodiments, a viscosity value is considered to be too low when the glass has an increased tendency to stick to the rolling or pressing device or mold surface.

In some embodiments, the temperature and viscosity of the glass at the time of dispersing or immersing the metal in the glass preferably corresponds to a viscosity value adequate for a selected shaping technique. For example, the temperature of the glass at the time of dispersing or immersing the metal in the glass may correspond to viscosity values in a range of $10^2$ dPas to $10^8$ dPas for casting; the temperature of the glass at the time of dispersing or immersing the metal in the glass may correspond to viscosity values in a range of $10^3$ dPas to $10^5$ dPas for blowing; the temperature of the glass at the time of dispersing or immersing the metal in the glass corresponds to viscosity values in a range of $10^3$ dPas to $10^8$ dPas for pressing or rolling. In some embodiments, for example, the viscosity of the glass may be at least $10^2$ dPas, at least $10^3$ dPas, or at least $10^4$ dPas. In some embodiments, the viscosity of the glass may be up to $10^3$ dPas, up to $10^4$ dPas, up to $10^5$ dPas, up to $10^6$ dPas, up to $10^7$ dPas, or up to $10^8$ dPas. In some embodiments, for example, when the glass is pressed or rolled, the temperature of the glass at the time of dispersing or immersing the metal in the glass corresponds to a viscosity in a range of $10^3$ dPas to $10^8$ dPas.

When casting is used to form a metal-glass macrocomposite, molten glass may be directed into a mold where it solidifies, and the final shape of the article is determined by the mold. In some embodiments, the mold may be made of graphite. For casting, glass may be heated to a molten or low viscous state. When casting and/or a mold is used, the metal to be dispersed or immersed may be heated to a temperature up to, equal to, or greater than the glass shaping temperature and placed in a desired position in the mold before, during, and/or after glass casting. The colder the metal, the more heat it receives from the glass. Additionally, a mold with a lower temperature than that of glass at the time of first contact, takes heat away from the glass. In some embodiments, a heat balance calculation may be done to calculate the temperatures of the components required to prevent glass cooling below the transition temperature during macrocomposite processing and before annealing, which could increase the risk of glass cracking. In some embodiments, as further described above, the metal may be preheated. In some embodiments, a mold may be preheated. In some embodiments, a mold may be preheated to at least the $T_g$ of glass.

When pressing is used to form a metal-glass macrocomposite, a metal insert may be introduced into the mold before, during, and/or after glass pouring.

When rolling is used to form a metal-glass macrocomposite, glass may be poured onto metal, and/or a metal insert may be introduced onto a glass surface or put into the bulk of the glass after the preliminary rolling of the glass into a shape.

When glass blowing is used to form a metal-glass macrocomposite, the glass may be blown into a metal mold, taking the form of the metal shape, or extending beyond the boundary of the metal shape from perforations existing in the metal body. The glass may be blown in a freeform fashion where the glass shape is determined by the blowing pressure and time, or controlled by a form that defines the shape of the blown glass.

In some embodiments, a non-molten piece of metal may be inserted into glass having a viscosity value between $10^3$ dPas and $10^8$ dPas.

In some embodiments, the metal may be molten at the time of dispersing or immersing the metal in the glass. For example, molten metal may be poured into molten glass. In some embodiments where the metal is molten at the time of initial contact with glass, the metal may have temperature that is up to 200° C., up to 300° C., up to 400° C., up to 500° C., up to 600° C., up to 700° C., or up to 750° C. greater than the temperature of glass at the time of contact. In some embodiments, the molten metal may have the same temperature as the glass at the time of contact. In some embodiments, glass and molten copper may have the same temperature at the time of contact, for example, 1100° C. In some embodiments, glass and molten gold may have the same temperature at the time of contact, for example, 1090° C.

For example, in one embodiment, copper may be melted at a temperature of up to 1150° C. in conditions protecting the copper from oxidation, and cast into glass with a temperature greater than the $T_g$ of the glass. For example, the temperature of the glass may be up to 100° C., up to 200° C., up to 300° C., up to 400° C., up to 500° C., up to 600° C., or up to 700° C. greater than the $T_g$ of the glass. The molten glass-copper composite may be cast, pressed, rolled, or blown, in the same manner as described above. In some embodiments, immediately after molten copper and glass contact one another, the glass may partially dissolve molten copper into the glass, producing oxidized copper filaments and strands within the macrocomposite.

Due to the difference in densities of glasses and the densities of metals, solidification of a glass-metal macrocomposite may be associated with uncontrolled or hard to control sinking movement of the metal insert inside the glass matrix. In some embodiments, several layers of glass of different viscosities may be cast prior to the insertion of metal, to control the position of the metal in the final macrocomposite. In some embodiments, a mold may be held at a selected temperature suited for a desired effect, such as more viscous glass at the bottom layer followed by less viscous glass layers. In some embodiments, coils with cooling water circuits and/or rings of electrical heating elements may be installed on an external mold (for example, a crucible) surface and temperature sensors (thermocouples or resistant thermometers) may be placed in the area to be controlled. The control system may regulate water flow rate and/or electric current to maintain the set temperature or cooling curve. The hold temperature should be selected outside of the range of temperatures within which the glass is susceptible to crystallization.

In some embodiments, the glass of the macrocomposite may include a float glass. In some embodiments, float glass includes a sheet of glass prepared by a float method including, for example, by floating molten glass on a bed of molten metal.

In some embodiments, a metal may be fused to a float glass. In some embodiments, the metal may have a matching coefficient of thermal expansion with the float glass. In such macrocomposites including a float glass, including macrocomposites formed using fusing process having a temperature in a range of 800° C. to 840° C., the surface of an optically smooth float glass may be irreversibly spoiled, however.

In some embodiments, including when the macrocomposite includes a float glass, the macrocomposite may further include an additional glass. For example, a macrocomposite may include a second glass, a third glass, a fourth glass, etc. In some embodiments, at least one additional glass may be a solder glass. The additional glass may be in the form of a powder, a frit, a grain, a rod, a fiber, a stripe, a thin plate, or another processed form suitable for the application. The additional glass may be used to bind the metal and float glass together into a compact and rigid unit. In some embodiments, the additional glass may be located between the metal and the float glass. In some embodiments, the additional glass may include a colored glass.

In some embodiments, an additional glass may have a Littleton softening point ($T_{Lit}$) less than the glass transition temperature ($T_g$) of the float glass. Without wishing to be bound by theory, it is believed that the second glass having a $T_{Lit}$ less than the $T_g$ of the float glass promotes the maintenance of surface integrity of the glass. In some embodiments, the $T_{Lit}$ of the second glass may be up to 550° C. In some embodiments, it is preferred for the $T_g$ for the second glass to be up to 450° C. In some embodiments, the glass preferably has a chemical durability that meets the standards of US Pharmacopeia type III glass.

To maintain an optically smooth surface, a phosphate glass having a $T_g$ lower than the $T_g$ of a float glass may be used as an additional glass. Without wishing to be bound by theory, it is believed that using phosphate glass in the metal-float glass macrocomposite allows the sealing process to take place at temperature significantly less than the $T_g$ of float glass, preserving the optically smooth glass surface of the float glass.

For example, metal elements may be placed and/or distributed in float glass plates. In some embodiments, the metal component may be ground and/or polished to a required thickness and/or surface texture before joining with the float glass plate using a solder glass. For example, a hole in a glass plate in the shape of the metal insert may be cut (for example, using a water jet). After cleaning of the edges of the insert and the hole, the metal may be placed into the hole in the glass, and the gap between glass and the insert may be filled with an additional glass.

In some embodiments, the gap between the metal insert and the float glass may be filled with one or more additional glasses (for example, solder glass) having a thermal expansion coefficient between the thermal expansion coefficient of the metal and the thermal expansion coefficient of the float glass. In some embodiments, the gap between a metal insert and a float glass may be filled on the metal side with a second glass that has a thermal expansion coefficient closer to that of the metal, and on the glass side with a third glass that has thermal expansion coefficient closer to that of float glass (for example, $80 \times 10^{-7} K^{-1}$ to $95 \times 10^{-7} K^{-1}$).

In some embodiments, including when at least a portion of the glass of a macrocomposite is in solid state before being placed in contact with the metal, the macrocomposite may further include an additional glass. For example, a macrocomposite may include a second glass, a third glass, a fourth glass, etc. In some embodiments, a cut wider than the size of the metal to be inserted may be made and the gap between the metal insert and the glass may be filled with one or more additional glasses. The one or more additional glasses may have a thermal expansion coefficient between the thermal expansion coefficient of the metal and the thermal expansion coefficient of the glass. In some embodiments, in which the thermal expansion coefficient of the metal is higher than the thermal expansion coefficient of the glass in solid state, a second and third glass may fill the gap between a metal insert and a float glass, wherein the second glass has a higher thermal expansion coefficient on the metal insert side, and a third glass has a lower thermal expansion coefficient on the float glass side. In some embodiments, in which the thermal expansion coefficient of the metal is lower than the thermal expansion coefficient of the glass in solid state, a second and third glass may fill the gap between a metal insert and a float glass, wherein the second glass has a lower thermal expansion coefficient on the metal insert side, and a third glass has a higher thermal expansion coefficient on the float glass side.

Because a float glass plate with a metal insert joined with solder glass may not be suitable for conventional thermal tempering, in some applications, the macrocomposite may include a second glass, a third glass, a fourth glass and/or a fifth glass, wherein the second glass, third glass, fourth glass and/or fifth glass are on the surface of the glass opposite the metal. Such additional glass may, in some embodiments encase the metal-glass macrocomposite. By encasing the macrocomposite, the macrocomposite may be further protected against, for example, mechanical damage resulting from a thermal shock to the macrocomposite.

After processing and/or formation of the desired shape of the metal-glass macrocomposite, the macrocomposite may be cooled in a controlled manner. In some embodiments, the rate of cooling may be selected based on the coefficient of thermal expansion of the macrocomposite. For example, increases in the coefficient of thermal expansion may be reflected by decreases in the rate of cooling. The temperature of the macrocomposite and/or a furnace including the macrocomposite may be cooled at a certain number of degrees per hour. In some embodiments, of the macrocomposite and/or a furnace including the macrocomposite may be cooled at rate of 20° C. per hour and/or a rate of 50° C. per hour.

In some embodiments, the macrocomposite may be annealed. In some embodiments, annealing temperature(s) may be selected according to the $T_g$ of glass. In some embodiments, the annealing temperature may be 330° C., 340° C., 350° C., 360° C., 370° C., 380° C., 390° C., or 400° C. In some embodiments, the macrocomposite may be annealed for at least 2 hours, at least 2.5 hours, at least 3 hours, at least 3.5 hours, at least 4 hours, or at least 5 hours. In some embodiments, the macrocomposite may be annealed for up to 3 hours, up to 3.5 hours, up to 4 hours, up to 4.5 hours, up to 5 hours, or up to 6 hours. In some embodiments, an annealing time-temperature curve may be selected depending on the thickness and/or volume of the glass-metal item and relative thickness and/or volume of the metal to the glass. General guidelines for annealing conditions are described for example in: Inorganic Glasses: Commercial Glass Families, Applications, and Manufacturing Methods. Thomas P. Seward III and Arun K. Varshneya, Chapter 6 in Handbook of Ceramics, Glasses, and Diamonds, C. A. Harper, ed., New York, 2001. In some embodiments, the time and temperature of an annealing time-temperature curve may be selected according to ASTM C336-71 (2015).

The present invention is illustrated by the following examples. It is to be understood that the particular examples, materials, amounts, and procedures are to be interpreted broadly in accordance with the scope and spirit of the invention as set forth herein.

EXAMPLES

In the following Examples, all reagents, starting materials, and solvents used in the following examples were purchased from commercial suppliers (such as Stanlab Sp. J., Lublin, Poland) and were used without further purification unless otherwise indicated.

Example 1. Bronze-Glass Macrocomposite

Metal Preparation

Bronze was cut into a 7 millimeter (mm) thick disc with a 20 mm diameter using an angle grinder with a diamond disc. The surface of the bronze was ground with a metal file to ensure a reflective surface.

Glass Composition Preparation

The components and proportions of the glass composition are shown in Table 4. A 210 gram (g) batch was manually milled in a mortar to ensure uniform melt, and was transferred with a spoon into a 200 milliliter (ml) glazed porcelain crucible at room temperature, and enclosed in a protective cover of two larger crucibles made of bisque porcelain.

TABLE 4

| Compound | Mass Percent (Weight Percent) |
|---|---|
| ZnO | 33.10 |
| $P_2O_5$ | 45.84 |
| $Al_2O_3$ | 1.80 |
| $TiO_2$ | 0.20 |
| $Na_2O$ | 7.88 |
| $K_2O$ | 9.20 |
| CaO | 1.98 |

Melting Procedure:

The glass was heated according to the following protocol: Room temperature to 200° C. over 40 minutes, 200° C. to 400° C. over 40 minutes, 400° C. to 800° C. over 40 minutes, 800° C. to 1150° C. over 60 minutes and then held at 1150° C. for 120 minutes.

Casting Procedure:

The melt was allowed to cool from 1150° C. to 800° C., as dictated by natural cooling of the closed furnace. At 800° C., the glass was cast into a cylindrical mold measuring 6 centimeters (cm) in diameter, and 7 cm in height, that had been preheated to 400° C. When the glass reached a temperature of 750° C., the room temperature bronze disc, at 20° C., was inserted into the glass. The resulting macrocomposite was transferred to the annealing furnace immediately after the metal was inserted in the glass, and then treated as described below.

Annealing Procedure:

A mold with the macrocomposite was inserted into an annealing furnace operating at 400° C. and annealed at 350° C. for 3.5 hours. The temperature curve was set to decrease temperature at a rate of 20° C. per hour from 350° C. to 300° C., then 50° C. per hour from 300° C. to 100° C. The furnace was switched off at 100° C. and left to cool to room temperature, with the cooling time dictated by self-cooling of the furnace, without the intervention of a power supply.

A representative image of the resulting macrocomposite can be seen in FIG. 1

Example 2. Gold-Glass Macrocomposite

Metal Preparation

A 1 gram (g) gold tablet was prepared by wiping its surface with a cloth to remove dust.

Glass Composition Preparation:

The components and proportions of the glass composition are shown in Table 5. A 210 g batch was manually milled in a mortar to ensure uniform melt, and was charged at room temperature into a 200 ml glazed porcelain crucible enclosed in a protective cover of two larger crucibles made of bisque porcelain.

TABLE 5

| Compound | Mass Percent (Weight Percent) |
| --- | --- |
| ZnO | 35.39 |
| $P_2O_5$ | 46.12 |
| $Al_2O_3$ | 1.48 |
| $TiO_2$ | 0.39 |
| $Na_2O$ | 6.60 |
| $K_2O$ | 10.03 |

Melting Procedure:

The glass was heated according to the following protocol: Room temperature to 200° C. over minutes, 200° C. to 400° C. over 40 minutes, 400° C. to 800° C. over 40 minutes, 800° C. to 1100° C. over 60 minutes and then held at 1100° C. for 60 minutes.

Casting Procedure:

The melt was allowed to cool from 1100° C. to 820° C., as dictated by natural cooling of the closed furnace. At 800° C., the melted glass was cast into a cylindrical mold measuring 6 cm in diameter, and 7 cm in height that had been preheated to 300° C. When the glass reached a temperature of 760° C., the room temperature gold tablet was inserted into the glass. The resulting macrocomposite was transferred to the annealing furnace immediately after the metal was inserted into the glass, and then treated as described below.

Annealing Procedure:

The mold with the macrocomposite was inserted into annealing furnace operating at 400° C. and annealed at 360° C. for 3.5 hours. The temperature curve was set to decrease temperature at a rate of 20° C. per hour, from 360° C. to 310° C., then 50° C. per hour from 310° C. to 100° C. The furnace was switched off at 100° C. and left to cool to room temperature, with the cooling time dictated by self-cooling of the furnace without the intervention of a power supply.

Figure 2:
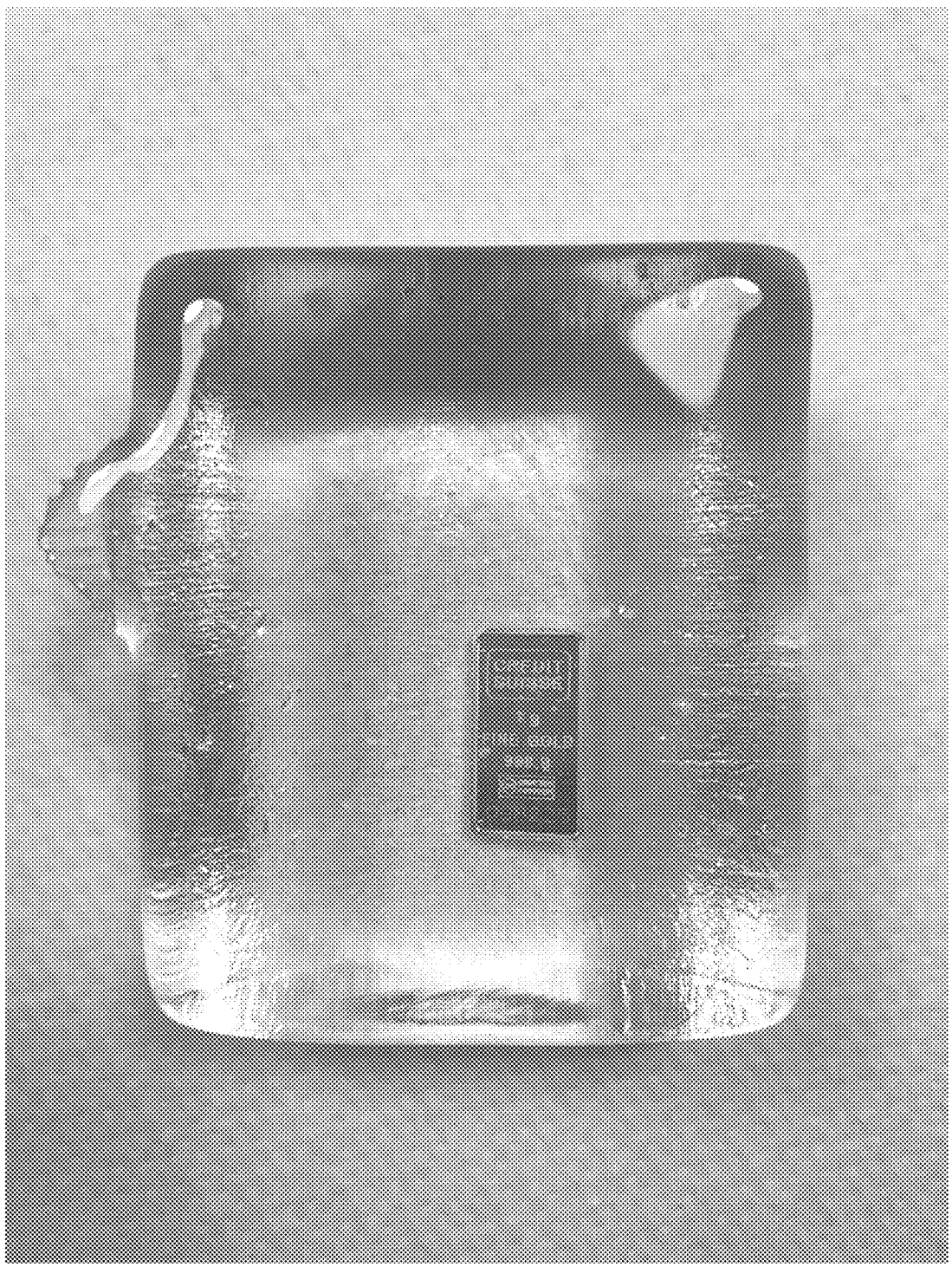
FIG. 2 shows a top view of a rectangular gold plate, fully immersed and suspended in cast glass; made as described in Example 2.

A representative image of the resulting macrocomposite can be seen in FIG. 2.

Example 3. Rusted Steel-Glass Macrocomposite

Metal Preparation:

Two rusted steel rods 5 mm in diameter were cut to 25 mm lengths using a diamond disk.

Glass Composition Preparation:

The components and proportions of the glass composition are shown in Table 6. The 210 g batch was manually milled in a mortar to ensure uniform melt, and was charged at room temperature into a 200 ml glazed porcelain crucible enclosed in a protective cover of two larger crucibles made of bisque porcelain.

TABLE 6

| Compound | Mass Percent (Weight Percent) |
| --- | --- |
| ZnO | 38.37 |
| $P_2O_5$ | 45.10 |
| $Al_2O_3$ | 1.81 |
| $TiO_2$ | 0.20 |
| $Na_2O$ | 5.02 |
| $K_2O$ | 6.67 |
| CaO | 2.84 |

Melting Procedure:

The glass was heated according to the following protocol: Room temperature to 200° C. over 40 minutes, 200° C. to 400° C. over 40 minutes, 400° C. to 800° C. over 40 minutes, 800° C. to 1150° C. over 60 minutes and then held at 1150° C. for 120 minutes Casting Procedure:

The melt was allowed to cool from 1150° C. to 820° C., as dictated by natural cooling of the closed furnace. At 820° C., the melted glass was cast into a cylindrical mold measuring 6 cm in diameter, and 7 cm in height that had been preheated to 400° C. When the glass reached a temperature of 800° C., the room-temperature rusted steel was inserted into the glass. The mold with macrocomposite was shaken using metal tongs to remove bubbles. After shaking, the resulting metal-glass macrocomposite was transferred to the annealing furnace and then treated as described below.

Annealing Procedure:

A mold with the macrocomposite was inserted into an annealing furnace operating at 400° C. and annealed at 350° C. for 3.5 hours. The temperature curve was set to decrease temperature at a rate of 20° C. per hour, from 350° C. to 300° C., then 50° C. per hour from 300° C. to 100° C. The furnace was switched off at 100° C. and left to cool to room temperature, with the cooling time dictated by self-cooling of the furnace without the intervention of a power supply.

Figure 3:
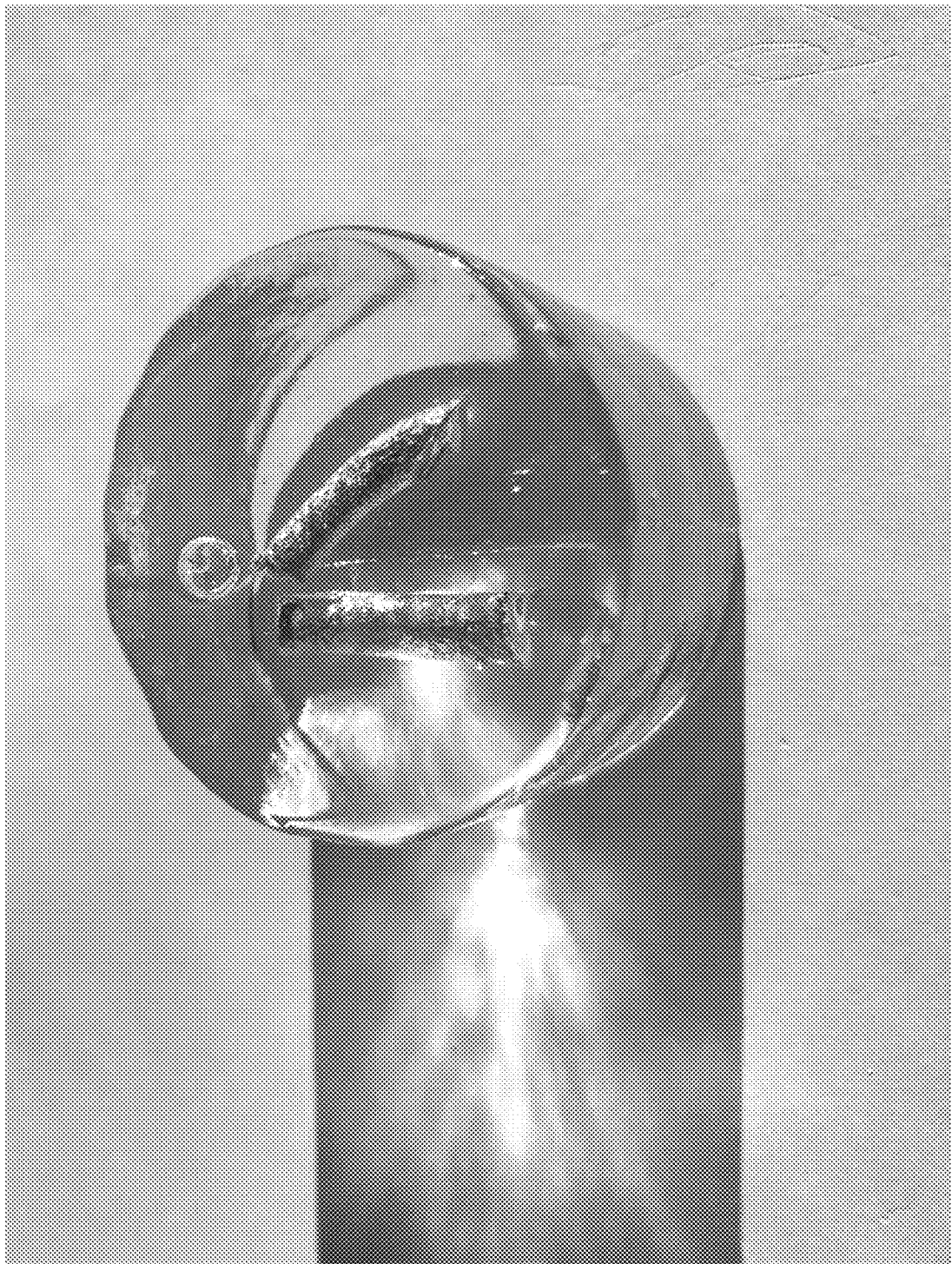
FIG. 3 shows a perspective view of two cut rusted steel rods fully immersed and suspended in cast glass; made as described in Example 3.

A representative image of the resulting macrocomposite can be seen in FIG. 3.

Example 4. Titanium-Glass Macrocomposite

Figure 4:
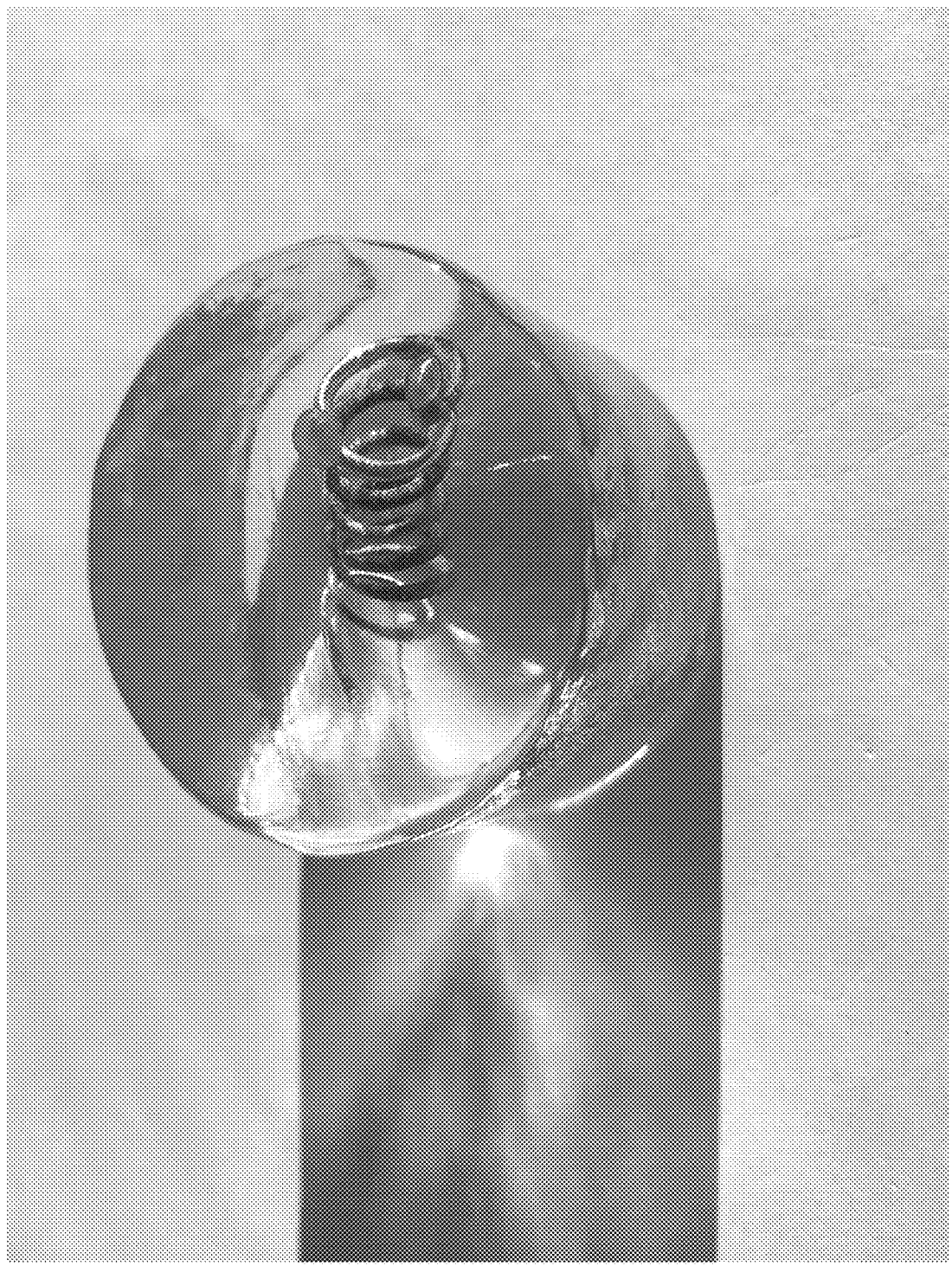
FIG. 4 shows a top view of a titanium spiral, fully immersed and suspended in cast glass; made as described in Example 4.

Metal Preparation:

Titanium wire (2 mm diameter) was cut to 16 cm and manually bent into a coil, as shown in FIG. 4.

Glass Composition Preparation:

The components and proportions of the glass composition are shown in Table 7. A 210 g batch was manually milled in a mortar to ensure uniform melt, and was charged at room temperature into a 200 ml glazed porcelain crucible enclosed in a protective cover of two larger crucibles made of bisque porcelain.

TABLE 7

| Compound | Mass Percent (Weight Percent) |
|---|---|
| ZnO | 40.66 |
| $P_2O_5$ | 44.78 |
| $Al_2O_3$ | 1.03 |
| $TiO_2$ | 1.41 |
| $Na_2O$ | 5.01 |
| $K_2O$ | 5.71 |
| CaO | 1.42 |

Melting Procedure:

The glass was heated according to the following protocol: Room temperature to 200° C. over 40 minutes, 200° C. to 400° C. over 40 minutes, 400° C. to 800° C. over 40 minutes, 800° C. to 1150° C. over 60 minutes and then held at 1150° C. for 120 minutes.

Casting Procedure:

The melt was allowed to cool from 1150° C. to 790° C., as dictated by natural cooling of the closed furnace. At 790° C., the melted glass was cast into a cylindrical mold measuring 6 cm in diameter, and 7 cm in height that had been preheated to 415° C. When the glass reached a temperature of 770° C., the room temperature titanium was inserted into the glass. The resulting macrocomposite was transferred to the annealing furnace immediately after the metal was inserted in the glass, and then treated as described below.

Annealing Procedure:

A mold with the macrocomposite was inserted into annealing furnace operating at 415° C. and annealed at 380° C. for 3.5 hours. The temperature curve was set to decrease temperature at a rate of 20° C. per hour, from 380° C. to 330° C., then 50° C. per hour from 330° C. to 100° C. The furnace was switched off at 100° C. and left to cool to room temperature, with the cooling time dictated by self-cooling of the furnace without the intervention of a power supply.

A representative image of the resulting macrocomposite can be seen in FIG. 4.

Example 5. Copper-Glass Macrocomposite

Metal Preparation

A 30 mm 99.9% copper metal tube was cut to 25 mm length using an angle grinder with a diamond disc. The copper was perforated using a stationary drill press. The distribution of holes was selected in order to maximize the desired dispersion of light through the holes in the final product. The sharp copper edges were ground using a metal file to ensure a uniform surface. The copper shape was subjected to a series of polishing steps in order to attain desirable uniformly polished surface. The steps involve a sequence of increasingly fine grain grits. Next, the copper received a final polish using felt disk on a rotary tool. The copper was washed with distilled water and submerged into alcohol to eliminate remaining marks. The copper was allowed to dry completely.

Glass Composition Preparation:

The components and proportions of the glass composition are shown in Table 8. A 210 g batch was ball-milled to ensure uniform melt, and was charged at room temperature into a lidded 200 ml glazed porcelain crucible.

TABLE 8

| Compound | Mass Percent (Weight Percent) |
|---|---|
| ZnO | 36.33 |
| $P_2O_5$ | 43.65 |
| $TiO_2$ | 1.19 |
| $Na_2O$ | 6.46 |
| $K_2O$ | 9.81 |
| $CeO_2$ | 2.56 |

Melting Procedure:

The glass was heated according to the following protocol: 70° C. to 200° C. over 40 minutes, 200° C. to 400° C. over 30 minutes, 400° C. to 800° C. over 40 minutes, 800° C. to 1100° C. over 40 minutes and then held at 1100° C. for 60 minutes.

Casting Procedure:

The melt was allowed to cool from 1100° C. to 850° C., as dictated by natural cooling of the closed furnace. At 830° C., the melted glass was cast into a cylindrical mold measuring 6 cm in diameter, and 7 cm in height. When the glass reached a temperature of 790° C., the room-temperature copper ring was inserted into the glass. The remaining molten glass was poured on top, covering the metal structure completely. The resulting macrocomposite was transferred to the annealing furnace immediately after the remaining glass was poured, and then treated as described below.

Annealing Procedure:

A mold with the macrocomposite was inserted into annealing furnace operating at 400° C. and annealed at 360° C. for 3 hours. The temperature curve was set to decrease temperature at a rate of 50° C. per hour, from 360° C. to 100° C. The furnace was switched off at 100° C. and left to cool to room temperature, with the cooling time dictated by self-cooling of the furnace without the intervention of a power supply.

Figure 5:
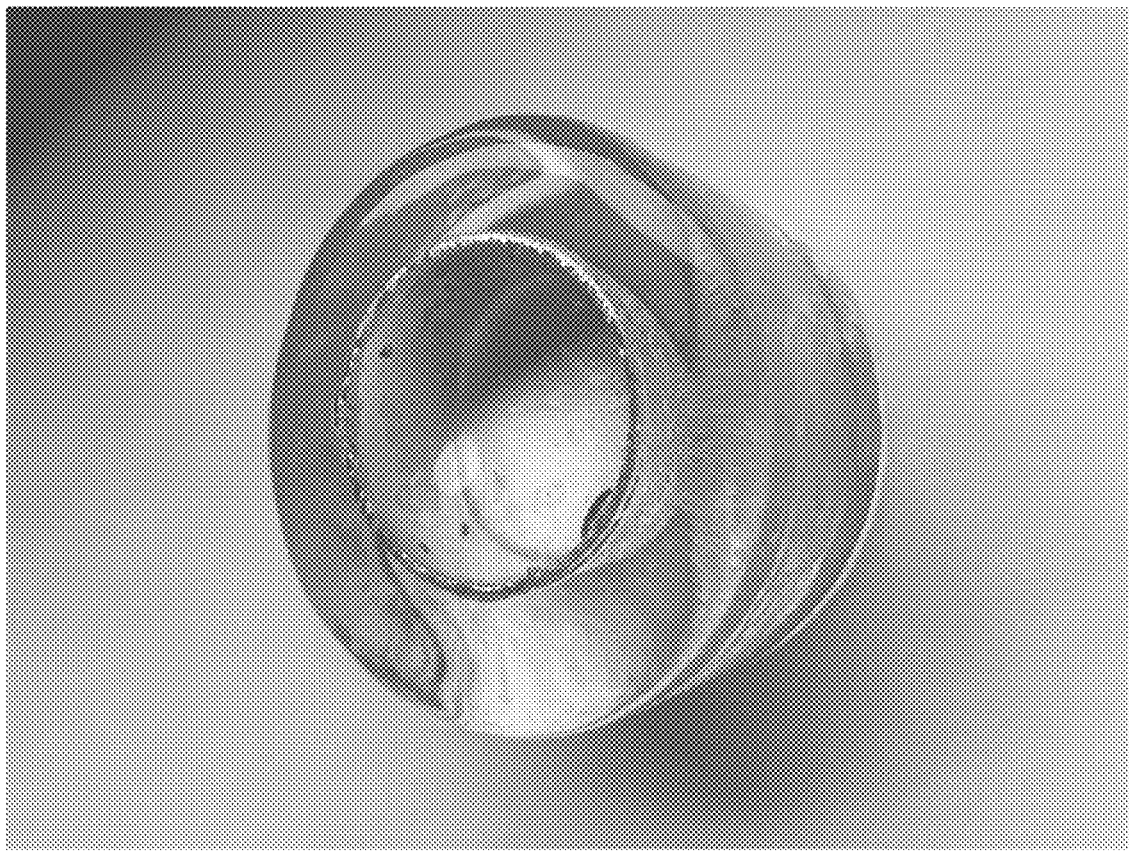
FIG. 5 shows a top view of a copper tube fully immersed in colored (yellow) cast glass; made as described in Example 5.

A representative image of the resulting macrocomposite can be seen in FIG. 5.

Example 6. Cast Copper-Glass Macrocomposite

Metal Preparation:

Two chunks of 99.9% copper measuring 200 mm by 10 mm by 15 mm were inserted at room temperature into a 2 kg graphite crucible, placed inside a 2 kg melting furnace (Model Schmelzofen Goldbrunn 2000). The copper was heated from room temperature to 1095° C. over 30 minutes then held at 1095° C. in the melting furnace for 40 minutes.

Glass Composition Preparation:

The components and proportions of the glass composition are shown in Table 9. Two batches, measuring 210 g per batch were each manually milled in a mortar to ensure uniform melt, and were charged at room temperature into two separate 200 ml glazed porcelain crucibles, each enclosed in a protective cover of two larger crucibles made of bisque porcelain.

TABLE 9

| Compound | Mass Percent (Weight Percent) |
| --- | --- |
| ZnO | 36.72 |
| $P_2O_5$ | 44.12 |
| $Al_2O_3$ | 1.53 |
| $TiO_2$ | 0.4 |
| $Na_2O$ | 6.84 |
| $K_2O$ | 10.39 |

Melting Procedure:

The glass was heated according to the following protocol: Room temperature to 200° C. over 40 minutes, 200° C. to 400° C. over 40 minutes, 400° C. to 800° C. over 40 minutes, 800° C. to 1100° C. over 60 minutes and then held at 1100° C. for 60 minutes.

Casting Procedure:

The melt was allowed to cool from 1100° C. to 760° C., as dictated by natural cooling of the closed furnace. At 760° C., one batch of the melted glass was cast into a rectangular graphite mold measuring 12 cm in diameter, 8 cm in width, and 11 cm in height that had been preheated to 100° C. The molten copper, at 1095° C., was poured onto the glass. Next, the second batch of glass, now at 730° C., was poured onto the glass-copper macrocomposite. The resulting macrocomposite was transferred to the annealing furnace immediately after the second batch of glass was poured, and then treated as described below.

Annealing Procedure:

A mold with the macrocomposite was inserted into annealing furnace operating at 415° C. and annealed at 360° C. for 3 hours. The temperature curve was set to decrease temperature at a rate of 20° C. per hour, from 360° C. to 310° C., then 50° C. per hour from 310° C. to 100° C. The furnace was switched off at 100° C. and left to cool to room temperature, with the cooling time dictated by self-cooling of the furnace without the intervention of a power supply.

Figure 6:
FIG. 6 shows a top view of an irregular cast copper shape partially immersed in cast glass; made as described in Example 6.

A representative image of the resulting macrocomposite can be seen in FIG. 6.

Example 7. Cast Gold-Glass Macrocomposite

Metal Preparation:

Two gold tablets measuring 1 g each were inserted at room temperature into a 2 kg graphite crucible, placed inside a 2 kg melting furnace (Model Schmelzofen Goldbrunn 2000). The gold was heated from room temperature to 1090° C. over 30 minutes then held at 1090° C. in the melting furnace for 30 minutes.

Glass Composition Preparation:

The components and proportions of the glass composition are shown in Table 10. A batch measuring 210 g was manually milled in a mortar to ensure uniform melt, and was charged at room temperature into a 200 ml glazed porcelain crucibles, enclosed in a protective cover of two larger crucibles made of bisque porcelain.

TABLE 10

| Compound | Mass Percent (Weight Percent) |
| --- | --- |
| ZnO | 38.16 |
| $P_2O_5$ | 44.21 |
| $Al_2O_3$ | 1.84 |
| $TiO_2$ | 0.16 |
| $Na_2O$ | 6.20 |
| $K_2O$ | 9.43 |

Melting Procedure:

The glass was heated according to the following protocol: Room temperature to 200° C. over 40 minutes, 200° C. to 400° C. over 40 minutes, 400° C. to 800° C. over 40 minutes, 800° C. to 1100° C. over 60 minutes and then held at 1100° C. for 60 minutes.

Casting Procedure:

The melt was allowed to cool from 1100° C. to 760° C., as dictated by natural cooling of the closed furnace. At 760° C., the melted glass was cast into a cylindrical mold measuring 6 cm in diameter, and 7 cm in height that had been preheated to 415° C. The molten gold, at 1090° C., was poured into the glass. The resulting macrocomposite was transferred to the annealing furnace immediately after the gold was poured, and then treated as described below.

Annealing Procedure:

A mold with the macrocomposite was inserted into annealing furnace operating at 415° C. and annealed at 360° C. for 3.5 hours. The temperature curve was set to decrease temperature at a rate of 20° C. per hour, from 360° C. to 310° C., then 50° C. per hour from 310° C. to 100° C. The furnace was switched off at 100° C. and left to cool to room temperature, with the cooling time dictated by self-cooling of the furnace without the intervention of a power supply.

Figure 7:
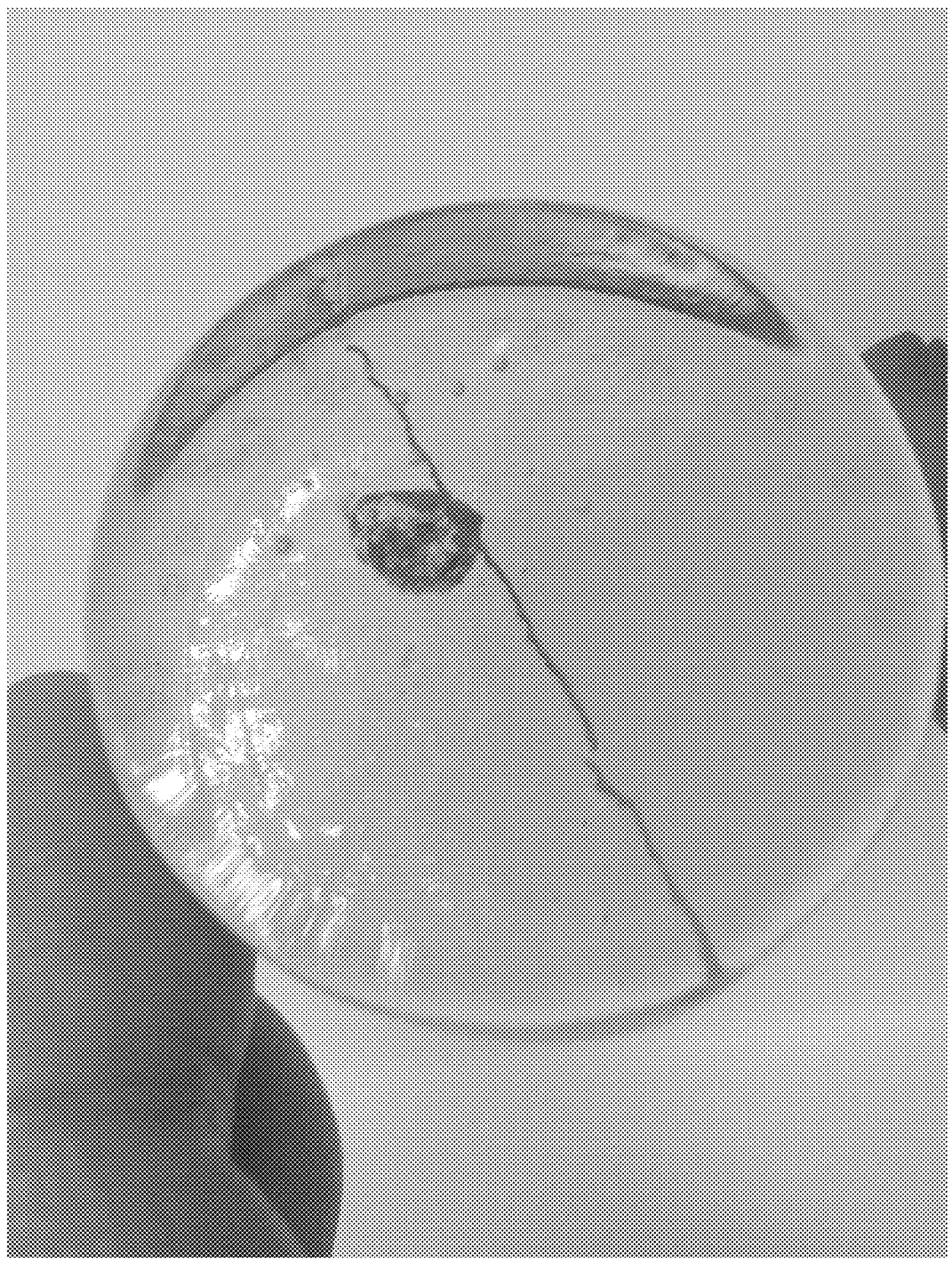
FIG. 7 shows a top view of an irregular cast gold shape fully immersed in cast glass; made as described in Example 7.

A representative image of the resulting macrocomposite can be seen in FIG. 7.

Example 8. Copper-Glass Macrocomposite

Metal Preparation:

A copper mesh of 0.38 mm wire width was cut using scissors to a size of 30 mm by 50 mm. The mesh was prepared by wiping its surface with a cloth to remove dust.

Glass Composition Preparation:

The components and proportions of the glass composition are shown in Table 11. A batch measuring 210 g was manually milled in a mortar to ensure uniform melt, and was charged at room temperature into a 200 ml glazed porcelain crucibles, enclosed in a protective cover of two larger crucibles made of bisque porcelain.

TABLE 11

| Compound | Mass Percent (Weight Percent) |
| --- | --- |
| ZnO | 34.40 |
| $P_2O_5$ | 45.30 |
| $Al_2O_3$ | 1.81 |
| $TiO_2$ | 0.20 |
| $Na_2O$ | 7.14 |
| $K_2O$ | 8.30 |
| CaO | 2.85 |

Melting Procedure:

The glass was heated according to the following protocol: Room temperature to 200° C. over 40 minutes, 200° C. to 400° C. over 40 minutes, 400° C. to 800° C. over 40 minutes, 800° C. to 1100° C. over 60 minutes and then held at 1100° C. for 60 minutes.

Casting Procedure:

The melt was allowed to cool from 1100° C. to 790° C., as dictated by natural cooling of the closed furnace. At 770° C., the melted glass was cast into a cylindrical mold measuring 6 cm in diameter, and 7 cm in height that had been preheated to 415° C. The room temperature copper mesh was inserted into the glass. The remaining molten glass was poured on top, covering the metal mesh completely. The resulting macrocomposite was transferred to the annealing furnace immediately after the remaining glass was cast, and then treated as described below.

Annealing Procedure:

A mold with the macrocomposite was inserted into annealing furnace operating at 415° C. and annealed at 370° C. for 3.5 hours. The temperature curve was set to decrease temperature at a rate of 20° C. per hour, from 370° C. to 320° C., then 50° C. per hour from 320° C. to 100° C. The furnace was switched off at 100° C. and left to cool to room temperature, with the cooling time dictated by self-cooling of the furnace without the intervention of a power supply.

Figure 8:
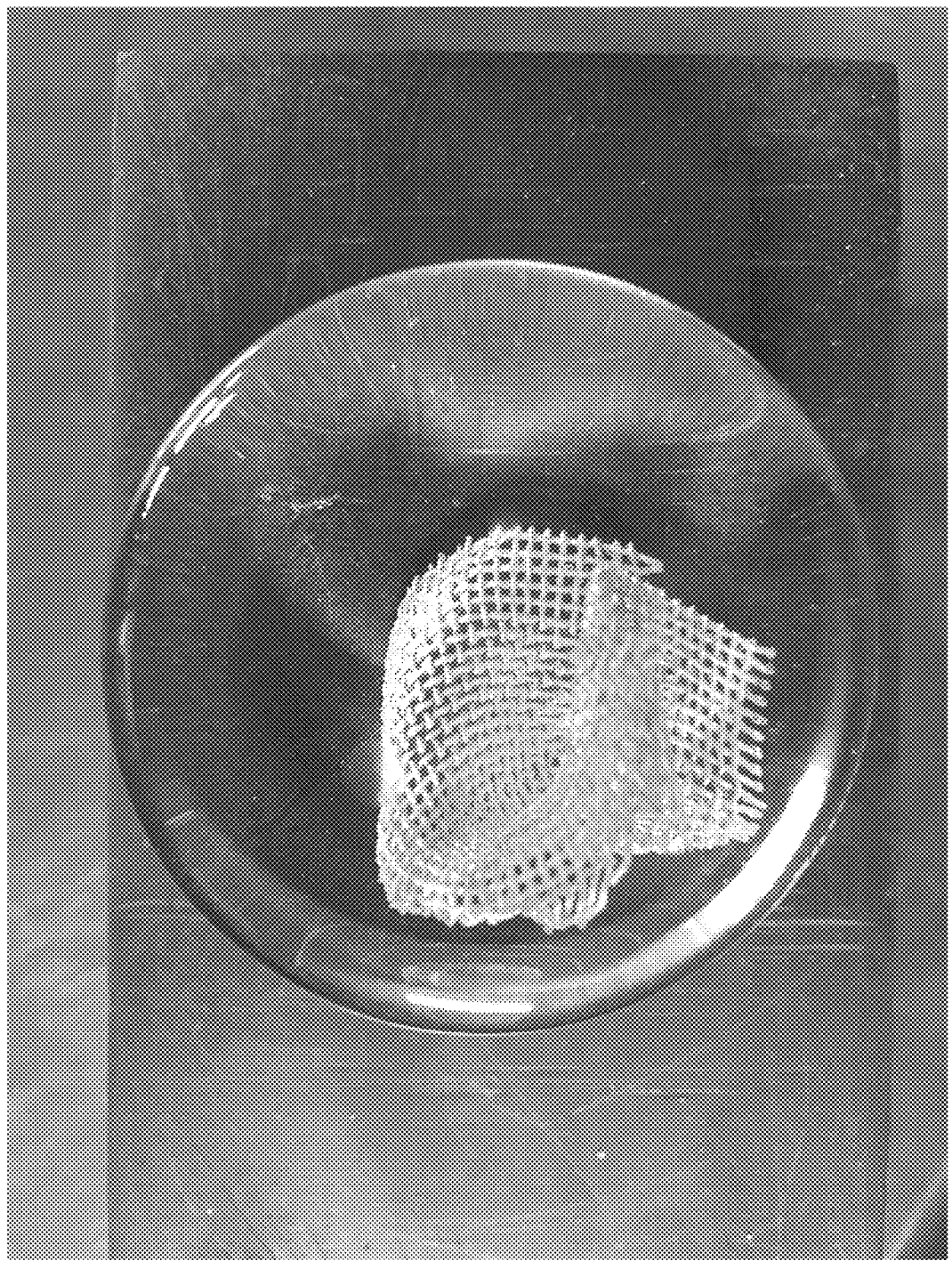
FIG. 8 shows a top view of a copper mesh fully immersed in cast glass; made as described in Example 8.

A representative image of the resulting macrocomposite can be seen in FIG. 8.

The complete disclosure of all patents, patent applications, and publications, and electronically available material cited herein are incorporated by reference. In the event that any inconsistency exists between the disclosure of the present application and the disclosure(s) of any document incorporated herein by reference, the disclosure of the present application shall govern. The foregoing detailed description and examples have been given for clarity of understanding only. No unnecessary limitations are to be understood therefrom. The invention is not limited to the exact details shown and described, for variations obvious to one skilled in the art will be included within the invention defined by the claims.

What is claimed is:

1. A method of forming a macrocomposite comprising:
dispersing or immersing a metal in a glass, wherein the metal has a volume of greater than 0.1 mm$^3$;
wherein the glass has a composition selected from Composition 1 and Composition 2:

|  | Composition 1 | Composition 2 |
| --- | --- | --- |
| ZnO | 38-50 | 45-52 |
| $P_2O_5$ | 29.5-34 | 38-42 |
| $Na_2O$ | 0-20 | 0-5 |
| $K_2O$ | 0-20 | 0-5 |
| $Li_2O$ | 0-20 | 0-5 |
| $Al_2O_3$ | 0-3 | 0-2 |
| $Bi_2O_3$ | 0-3 | 0-3 |
| $CeO_2$ | 0-2 | 0-2 |
| $TiO_2$ | 0.1-3 | 3-10 |
| $ZrO_2$ | 0-2 | 0-1 |
| $SnO_2$ | 0-2 | 0-2 |
| $Na_2O + K_2O + Li_2O$ | 11-25 | 1-6 |
| $Al_2O_3 + ZrO_2 + CeO_2 + TiO_2 + SnO_2$ | 0.1-6 | 3-10 |
| $Al_2O_3 + ZrO_2 + CeO_2 + TiO_2 + SnO_2 + P_2O_5$ | 29.6-36 |  | wherein the metal comprises at least one of copper, an aluminum bronze alloy, a copper alloy, bronze, iron, cast iron, steel, carbon steel, or titanium, wherein when the metal comprises at least one of copper, an aluminum bronze alloy, or a copper alloy, the glass has a thermal expansion coefficient in a range of $130 \times 10^{-7} K^{-1}$ to $185 \times 10^{-7} K^{-1}$, wherein when the metal comprises bronze, the glass has a thermal expansion coefficient in a range of $160 \times 10^{-7} K^{-1}$ to $185 \times 10^{-7} K^{-1}$;

wherein when the metal comprises at least one of iron, cast iron, steel, or carbon steel, the glass has a thermal expansion coefficient in a range of $90 \times 10^{-7} K^{-1}$ to $140 \times 10^{-7} K^{-1}$;

wherein when the metal comprises titanium, the glass has a thermal expansion coefficient in a range of $75 \times 10^{-7} K^{-1}$ to $105 \times 10^{-7} K^{-1}$, wherein the difference in the coefficients of thermal expansion between the metal and the glass is less than $30 \times 10^{-7} K^{-1}$, and wherein the macrocomposite does not comprise an organic resin, an adhesive, or a polymer.

2. The method of claim 1, wherein the metal is fully immersed or partially immersed in the glass.

3. The method of claim 1, wherein the temperature of the glass at the time of dispersing or immersing the metal in the glass is at least 20° C. greater than the $T_g$ of the glass.

4. The method of claim 1, wherein the temperature difference between the metal and the glass at the time of dispersing or immersing the metal in the glass is at least 100° C.

5. The method of claim 1, wherein the temperature of the metal is within 800° C. of the glass at the time of dispersing or immersing the metal in glass.

6. The method of claim 1, wherein the metal is at room temperature at the time of dispersing or immersing the metal in glass.

7. The method of claim 1, wherein the metal is molten at the time of dispersing or immersing the metal in glass.

8. The method of claim 1, wherein the glass further comprises at least one of CaO in a range of 0 mole percent to 7 mole percent, MgO in a range of 0 mole percent to 5 mole percent, and BaO in a range of 0 mole percent to 5 mole percent, wherein the glass comprises CaO+MgO+BaO in a range of 0 mole percent to 8 mole percent, and CaO+MgO+BaO+ZnO in a range of 38 mole percent to 55 mole percent.

9. The method of claim 1, wherein the metal comprises at least one of copper, an aluminum bronze alloy, or a copper alloy, and the glass comprises the following components in the following ranges:

| Component | Amount (mol %) Range |
| --- | --- |
| ZnO | 40.0-47.5 |
| $P_2O_5$ | 29.5-33.5 |
| $Al_2O_3$ | 0.5-2.0 |
| $TiO_2$ | 0.1-1.5 |
| $Na_2O$ | 7.5-12.5 |
| $K_2O$ | 7.5-12.5 |
| CaO | 0-7.0. |

10. The method of claim 1, wherein the metal comprises bronze, and the glass comprises the following components in the following ranges:

| Component | Amount (mol %) Range |
| --- | --- |
| ZnO | 40.0-42.0 |
| $P_2O_5$ | 31.0-33.0 |
| $Al_2O_3$ | 1.25-2.0 |
| $TiO_2$ | 0.2-0.30 |
| $Na_2O$ | 10.0-15.0 |
| $K_2O$ | 8.0-11.0 |
| CaO | 0.0-5.0. |

11. The method of claim 1, wherein the metal comprises at least one of iron, cast iron, steel, or carbon steel, and the glass comprises the following components in the following ranges:

| Component | Amount (mol %) Range |
| --- | --- |
| ZnO | 46.0-49.5 |
| $P_2O_5$ | 31.0-33.0 |
| $Al_2O_3$ | 1.25-3.0 |
| $TiO_2$ | 0.2-1.5 |
| $Na_2O$ | 6.0-11.0 |
| $K_2O$ | 5.0-10.0 |
| CaO | 0.0-5.0. |

12. The method of claim 1, wherein the metal comprises titanium, and the glass comprises the following components in the following ranges:

| Component | Amount (mol %) Range |
| --- | --- |
| ZnO | 48.0-50.0 |
| $P_2O_5$ | 31.0-33.0 |
| $Al_2O_3$ | 1.0-2.0 |
| $TiO_2$ | 0.1-3.0 |
| $Na_2O$ | 6.0-9.0 |
| $K_2O$ | 5.0-9.0 |
| CaO | 0.0-6.0. |

13. The method of claim 1 further comprising annealing the macrocomposite.

* * * * *